(12) United States Patent
Ardes

(10) Patent No.: US 9,644,508 B2
(45) Date of Patent: May 9, 2017

(54) LIQUID FILTER WITH A FILTER BYPASS VALVE AND WITH A CENTRAL DISCHARGE DUCT, AND FILTER INSERT FOR A LIQUID FILTER

(71) Applicant: Hengst SE & Co. KG, Muenster (DE)

(72) Inventor: Wilhelm Ardes, Ascheberg (DE)

(73) Assignee: Hengst SE & Co. KG, Muenster (DE)

(*) Notice: Subject to any disclaimer, the term of this patent is extended or adjusted under 35 U.S.C. 154(b) by 315 days.

(21) Appl. No.: 14/411,421

(22) PCT Filed: Jun. 21, 2013

(86) PCT No.: PCT/EP2013/062968
§ 371 (c)(1),
(2) Date: Dec. 26, 2014

(87) PCT Pub. No.: WO2014/001210
PCT Pub. Date: Jan. 3, 2014

(65) Prior Publication Data
US 2015/0337695 A1    Nov. 26, 2015

(30) Foreign Application Priority Data
Jun. 26, 2012 (DE) .................. 10 2012 210 834

(51) Int. Cl.
*F01M 11/03* (2006.01)
*B01D 35/147* (2006.01)
(Continued)

(52) U.S. Cl.
CPC ........... *F01M 11/03* (2013.01); *B01D 29/014* (2013.01); *B01D 35/147* (2013.01);
(Continued)

(58) Field of Classification Search
None
See application file for complete search history.

(56) References Cited

U.S. PATENT DOCUMENTS

| 6,569,326 B1 | 5/2003 | Baumann et al. |
| 6,685,829 B1 | 2/2004 | Baumann et al. |

(Continued)

FOREIGN PATENT DOCUMENTS

| DE | 19859960 | 7/2000 |
| DE | 20118683 | 3/2003 |

(Continued)

OTHER PUBLICATIONS

International Search Report, Feb. 10, 2014.

*Primary Examiner* — Terry Cecil
(74) *Attorney, Agent, or Firm* — Greer, Burns & Crain Ltd.

(57) ABSTRACT

A liquid filter having a housing with a removable cover and an exchangeable cylindrical insert enclosed by two end disks. The filter has a bypass valve and the upper end disk has a central valve seat interacting with a valve body. The housing has a central discharge duct, with a closure pin fixed in the duct which is axially adjustable between closed and open positions. The filter has a valve body carrier connected, with limited axial displaceability, to the pin. The carrier, on its free end, has the bypass valve body, and onto which the insert end disk is mountable. The carrier is preloaded with a force, acting in the closing direction of the valve via a housing spring. During mounting of the insert onto the carrier, a force acting in the closing direction of the closure pin can be exerted directly on the pin by the insert.

24 Claims, 39 Drawing Sheets

(51) Int. Cl.
*B01D 29/01* (2006.01)
*B01D 35/30* (2006.01)
*B01D 35/153* (2006.01)
*B01D 35/16* (2006.01)
*F02M 37/22* (2006.01)

(52) U.S. Cl.
CPC ....... *B01D 35/1475* (2013.01); *B01D 35/153* (2013.01); *B01D 35/16* (2013.01); *B01D 35/30* (2013.01); *B01D 35/306* (2013.01); *F02M 37/22* (2013.01); *B01D 2201/291* (2013.01); *B01D 2201/4007* (2013.01); *B01D 2201/4023* (2013.01); *B01D 2201/4046* (2013.01); *B01D 2201/4084* (2013.01)

(56) References Cited

U.S. PATENT DOCUMENTS

| | | |
|---|---|---|
| 2008/0053886 A1 | 3/2008 | Marshall et al. |
| 2010/0006493 A1 | 1/2010 | Maier et al. |
| 2010/0044295 A1 | 2/2010 | Honermann et al. |
| 2011/0042329 A1 | 2/2011 | Hacker et al. |
| 2012/0292240 A1 | 11/2012 | Hacker et al. |
| 2013/0193057 A1 | 8/2013 | Honermann et al. |

FOREIGN PATENT DOCUMENTS

| | | | |
|---|---|---|---|
| DE | 10243291 A1 * | 4/2004 | ........... B01D 29/114 |
| DE | 202007017979 | 4/2009 | |
| WO | 2008009324 | 1/2008 | |
| WO | 2008134494 | 11/2008 | |
| WO | 2009094437 | 7/2009 | |
| WO | 2009132291 | 10/2009 | |

\* cited by examiner

LIQUID FILTER WITH A FILTER BYPASS VALVE AND WITH A CENTRAL DISCHARGE DUCT, AND FILTER INSERT FOR A LIQUID FILTER

CROSS-REFERENCES TO RELATED APPLICATIONS

This application claims the benefit of the German patent application No. 102012210834.3 filed on Jun. 26, 2012, the entire disclosures of which are incorporated herein by way of reference.

BACKGROUND OF THE INVENTION

The present invention relates to a liquid filter, in particular an oil filter of an internal combustion engine, having a filter housing having a removable cover and having a raw liquid inlet and a clean liquid outlet, having a filter insert that is situated exchangeably in the filter housing and that separates a raw side and a clean side of the liquid filter from one another, the insert having a hollow cylindrical filter material body enclosed at its end faces by two end disks, the end disk that is the lower end disk in the installed state having a central mounting opening, the liquid filter having a filter bypass valve, for which purpose the end disk that is the upper end disk in the installed state having on its lower side a central valve seat that works together with a valve body, the filter housing further having a central discharge duct for emptying the filter housing when the filter insert is removed, and there being situated in the discharge duct a closing pin that is fixed to the housing in the installed state and that can be axially displaced between a closed position, assumed when the filter insert is installed and the cover is closed, and an open position, assumed when the cover is removed and the filter insert is removed. Moreover, the present invention relates to a filter insert for a liquid filter.

A liquid filter of the type indicated above is known from DE 201 18 683 U1. In this known liquid filter, the closing pin extends from the discharge duct upward into the filter insert, up to the upper end disk thereof. At the upper end of the closing pin, there is situated a valve body of the filter bypass valve, this valve body being axially displaceable relative to the closing pin, and the valve body being loaded with a force that acts upward, i.e., in the closing direction of the filter bypass valve, by a spring supported on the closing pin. Between the filter housing and a lower part of the closing pin there is situated a further spring that loads the closing pin with a force acting upward, i.e., in the direction toward the cover of the filter housing.

In this existing art, it is regarded as disadvantageous that a relatively large number of components, in particular two different springs, are required, resulting in correspondingly high production and assembly costs. Moreover, in this known liquid filter, the use of foreign filter inserts cannot effectively be prevented.

SUMMARY OF THE INVENTION

Therefore, for the present invention an object arises of creating a liquid filter of the type named above that avoids the indicated disadvantages and that in particular requires a lower number of individual parts, and in this way can be produced and assembled at lower cost. Moreover, a fitting, specific filter insert is to be created for the liquid filter according to the present invention.

According to the present invention, the first part of this object, relating to the liquid filter, is achieved by a liquid filter of the type described above that is characterized in that:
  connected to the closing pin, so as to be capable of axially limited displacement, there is a valve body carrier that runs through the filter insert and that has a valve body of the filter bypass valve on its free end, and onto which the filter insert can be mounted with its end disk having the mounting opening forward,
  the valve body carrier is pre-loaded with a force, acting in the closing direction of the filter bypass valve, of a spring supported on the filter housing, and
  the filter insert can exert, during or during and after its mounting onto the valve body carrier, a force acting immediately on the closing pin in the direction toward the closing position of the closing pin.

The present invention advantageously brings it about that the desired functioning of the filter bypass valve and discharge duct can be realized using only a single spring, without having to accept an impairment of the functioning or operational reliability of the liquid filter. In this way, the outlay in the production of the individual parts and in the assembly of the liquid filter, and thus the overall costs thereof, are reduced. At the same time, the liquid filter according to the present invention is robust and not sensitive to the danger of damage that can occur during possibly incorrect maintenance, because the closing pin is well protected inside the discharge duct, and only the valve body carrier connected to the closing pin runs through the filter insert.

In order to further promote low-cost production and assembly and good durability, it is preferably provided that the valve body carrier and the valve body of the filter bypass valve are fashioned in one piece.

In order to achieve a compact construction and a high degree of functional reliability, it is further preferably provided that the closing pin has, in its upper end region, two or more pusher lugs that are distributed around the circumference and that protrude radially outward past the outer circumference of the valve body carrier, on which lugs the thrust force acting in the direction toward the closing position of the closing pin can be exerted by the filter insert.

Usefully, the closing pin and the valve body carrier are held so as to be not capable of rotation relative to one another, which is advantageous for a precise mutual axial guiding.

In a preferred development of the liquid filter, it is proposed that actuating elements for the pusher lugs are situated on the lower end disk or on a supporting lattice of the filter insert. Here, the actuating elements can be simply integrally formed on, stably constructed, and housed in a space-saving fashion.

Preferably, here it is provided that the actuating elements are formed by two or more ribs that run axially and that protrude radially inward, or by a toothed configuration having a plurality of axially running teeth that protrude radially inward. In this way, a design is achieved that is stable and not liable to damage, and a spatially advantageous housing is also achieved.

In addition, it is provided that cooperating positioning guide means are situated on the inner circumference of the filter insert and on the outer circumference of the valve body carrier, with which the filter insert can be force-guided into a correctly engaged position of its actuating elements relative to the pusher lugs when the filter insert is mounted onto the valve body carrier in the circumferential direction. In this embodiment, a particularly reliable functioning is ensured.

Moreover, in this way a key-lock system can be realized that prevents the insertion of foreign filter inserts that do not fit and that do not have the positioning guide means and actuating elements.

In order to achieve a simple construction, preferably the actuating elements for the pusher lugs are identical to the positioning guide means provided on the filter insert.

In order to achieve a compact configuration of the individual parts, a helical pressure spring, surrounding the closing pin, is usefully situated as a spring between the lower end of the valve body carrier and the filter housing.

In order to facilitate the installation of the spring in the discharge duct of the liquid filter, the present invention proposes that on the outer circumference of the valve body carrier there are provided a plurality of outward-oriented retaining cams that engage with the spring when the spring is relaxed and are disengaged from the spring when the spring is at least partially compressed. Because in the installed state the spring is always more or less compressed, in this state it has no engagement with the valve body carrier, and therefore in the installed state does not exert any immediate force on the valve body carrier.

In order to ensure a mounting of the valve body carrier in the filter housing that is secure and not sensitive to damage or loss, it is proposed that the valve body carrier is guided in the filter housing, with a lower segment, so as to be capable of axial displacement, and that the displacement path of the valve body carrier is limited in the direction of excursion relative to the filter housing by a flexible cam system.

So that the sensor does not have to be immediately grasped during a filter maintenance session involving a change of the contaminated filter insert, it is proposed that the cover has on its lower side, and the upper end disk of the filter insert has on its upper side, cooperating releasable first locking connection means, rotatable relative to one another, with which a specifiable first tensile force in the axial direction can be transmitted. In this way, when the cover is removed from the filter housing the filter insert locked to the cover is removed from the filter housing along with it.

In addition, it is provided that the filter insert on the one hand, and the valve body carrier or the closing pin on the other hand, have cooperating releasable second locking connection means with which a specifiable second tensile force, smaller than the first tensile force, can be transmitted in the axial direction. These second locking connection means act, before a first installation of the liquid filter, to hold the valve body carrier and the closing pin on the filter insert so as to be adequately secured against unintentional loss, without hindering the later removal of the filter insert together with the cover secured thereto during the filter maintenance described in the previous paragraph.

In order to achieve a reliable sealing effect at low cost, preferably a, or each, seal provided on the closing pin is a radially sealing seal, preferably a sealing ring, more preferably an O-ring. Such seals are standardly available commercially at low cost, in a large number of different embodiments.

The liquid filter according to the present invention can be realized as an individual component, and can be connected to the engine block of an internal combustion engine, for example as an oil filter. For this embodiment as an individual component, it is preferably provided that the closing pin has a radially sealing seal in its lower part cooperating with the discharge duct, and that the discharge duct has, in its region that cooperates with the seal during the axial movement of the closing pin, two segments having different inner diameters becoming larger in stepped fashion going from below to above, the seal being situated freely in the segment having the larger inner diameter in the opening position, and being situated in sealing fashion in the segment having the smaller inner diameter in the closing position of the closing pin.

Alternatively, the liquid filter according to the present invention can also be part of a functional module having a plurality of components. Here, the present invention proposes that the liquid filter is connected to, or can be connected to, a heat exchanger for the liquid flowing through the liquid filter, and that the closing pin has, in its lower part cooperating with the discharge duct, two radially sealing seals axially at a distance from one another, and that the discharge duct has, in its region that cooperates with the seals during the axial movement of the closing pin, two segments having different inner diameters, becoming larger in stepped fashion from below to above, the seal having the smaller diameter being situated in sealing fashion in the segment having the smaller inner diameter in the closed position of the closing pin, and being situated in open fashion in the segment having the larger inner diameter in the open position of the closing pin, the seal having the larger diameter always being situated in sealing fashion in the segment having the larger inner diameter, and a first connecting channel between the liquid filter and the heat exchanger above the seal having the larger diameter going out from the discharge duct, and a second connecting channel between the heat exchanger and the liquid filter between the two seals opening into the discharge duct. In this way, it is achieved that during a filter maintenance both the filter housing and a heat exchanger connected thereto, in particular an oil cooler, is emptied of liquid, the path of the liquid flowing out from the filter housing running through the heat exchanger.

An alternative embodiment proposes that the liquid filter is connected to, or can be connected to, a heat exchanger for the liquid flowing through the liquid filter, and that the closing pin has, in its lower part cooperating with the discharge duct, two radially sealing seals situated at an axial distance from one another having different diameters, and that the discharge duct has, in its region cooperating with the seals during the axial movement of the closing pin, three segments having different inner diameters, becoming larger going from below to above, the seal with the smaller diameter being situated in sealing fashion in the segment having the smallest inner diameter in the closing position of the closing pin, and being open in the segment having the middle inner diameter in the open position of the closing pin, the seal having the larger diameter being situated in sealing fashion in the segment having the middle inner diameter in the closing position of the closing pin and open in the segment having the largest inner diameter in the open position of the closing pin, and a first connecting channel between the liquid filter and the heat exchanger above the seal having the larger diameter going out from the discharge duct, and a second connecting channel between the heat exchanger and the liquid filter between the two seals opening into the discharge duct. In this embodiment of the liquid filter, during a filter maintenance the liquid can flow out from the filter housing in parallel through the heat exchanger and past this heat exchanger immediately through the discharge duct, which shortens the time required to empty the filter housing.

Liquid filters are today in most cases completely or partly produced by suppliers and then supplied to customers who install the liquid filters, possibly after completion. Frequently, the customer supplies the filter housing and the supplier supplies all other parts of the liquid filter. In order to make the completion and subsequent installation of the liquid filter as easy as possible for the customer, according to the present invention it is provided that the liquid filter can be assembled from the filter housing on the one hand and a preassembled assembly on the other hand during its initial assembly, the preassembled assembly including the closing pin, the valve body carrier, the spring, the filter insert, and the cover. In this way, no loose individual parts have to be supplied and installed; the customer only has to introduce the preassembled assembly into the filter housing and connect the cover to the housing, standardly by screwing. After this, the liquid filter is immediately ready for use.

In addition, the present invention relates to a filter insert for a liquid filter, in particular for an oil filter of an internal combustion engine, the filter insert being made up of a hollow cylindrical filter material body enclosed at its ends by two end disks, the end disk that is the lower end disk in the installed state having a central mounting opening for mounting the filter insert onto a central valve body carrier of the liquid filter.

In order to achieve the second part of the object of the invention, relating to the filter insert, a filter insert is proposed that is characterized in that actuating elements are situated on the filter insert or are guided with the filter insert, by means of which the filter insert can exert a force immediately on pusher lugs of the closing pin, the force acting in the direction towards the closing position of a discharge duct closing pin of the liquid filter, and there being situated on the inner circumference of the filter insert first positioning guide means that are fashioned to cooperate with second positioning guide means situated on the outer circumference of the valve body carrier, such that with the positioning guide means the filter insert can be force-guided into a position proper for engagement of its actuating elements relative to the pusher lugs in the circumferential direction when the filter insert is mounted onto the valve body carrier.

The filter insert according to the present invention has specific elements that make it usable only for use in a liquid filter having the corresponding counter-elements, so that the use of unsuitable, non-fitting foreign filter inserts is in this way prevented.

Preferably, the actuating elements are situated on the lower end disk and/or on a central supporting lattice of the filter insert, where they are usefully integrally formed on in one piece.

Concretely, the actuating elements are preferably formed by two or more axially running ribs that protrude inward radially, or by a toothed configuration having a plurality of radially inward-protruding teeth that run axially.

The first positioning guide means are also preferably situated on the lower end disk and/or on a central supporting lattice of the filter insert, and usefully are also integrally formed on in one piece.

Advantageously, the actuating elements for the pusher lugs can be identical with the first positioning guide means provided on the filter insert, resulting in a favorable integration of a plurality of functions.

Alternatively, the actuating elements for the pusher lugs on the one hand and the first positioning guide means provided on the filter insert on the other hand can also be fashioned separately, facilitating an individual optimization for the particular purpose.

BRIEF DESCRIPTION OF THE DRAWINGS

In the following, exemplary embodiments of the present invention are explained on the basis of a drawing.

In the following description of the Figures, identical parts in the various Figures are always designated by the same reference characters, so that not all reference characters have to be explained anew in connection with each Figure.

DETAILED DESCRIPTION OF THE PREFERRED EMBODIMENTS

FIGS. 1 through 21 show a first exemplary embodiment of a liquid filter 1, such as an oil filter of an internal combustion engine.

Figure 1:
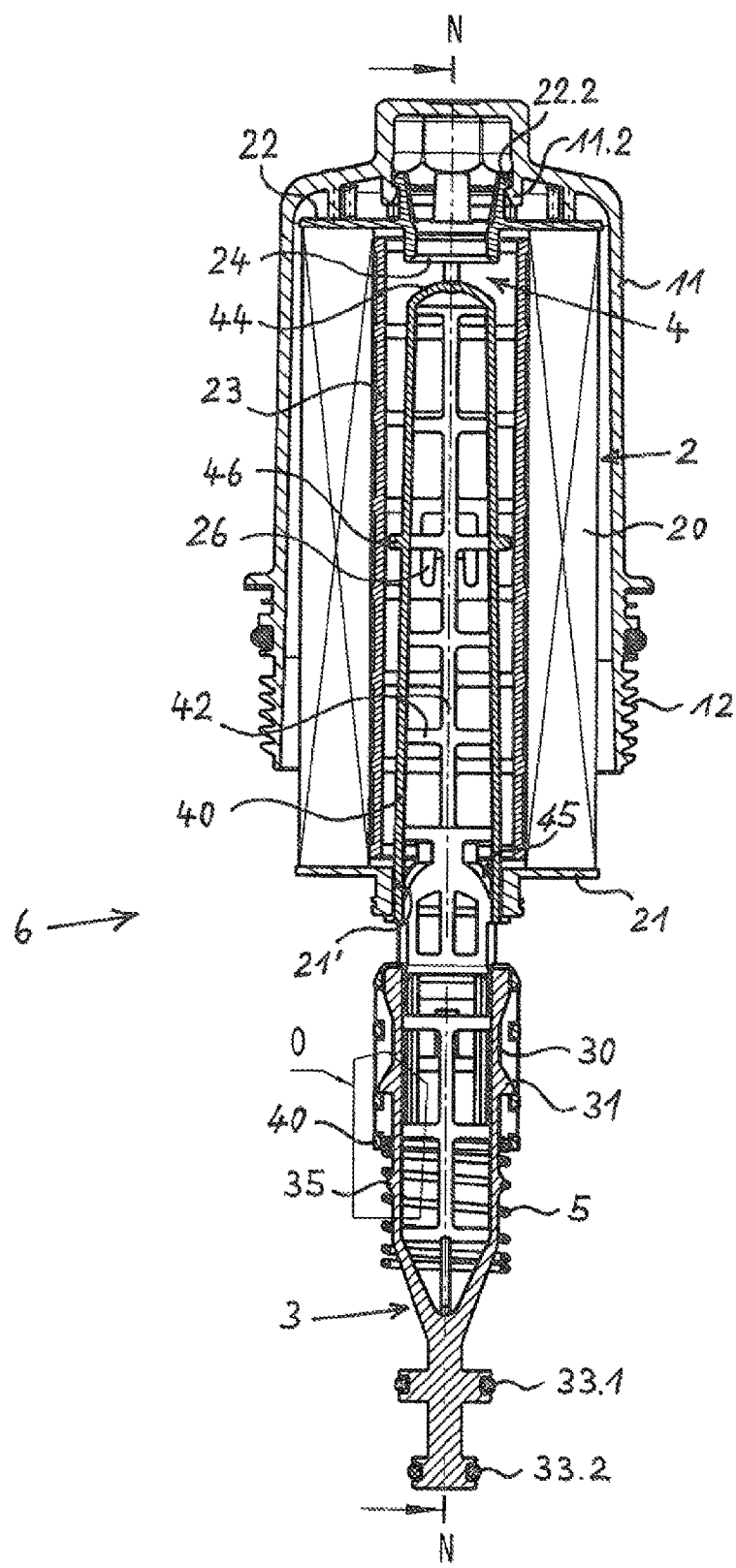
FIG. 1 through FIG. 21 show a first exemplary embodiment in various representations and various operating states.

FIG. 1 shows a preassembled assembly 6 made up of a filter insert 2, a screw cover 11, a closing pin 3, a valve body carrier 40, and a helical spring 5. Filter insert 2 is locked to cover 11 via locking connection means 11.2 and 22.2. In addition, filter insert 2 is locked to valve body carrier 40 via second locking connection means 26 and 46. Closing pin 3 is guided in axially displaceable fashion with a guide segment 30 in a lower segment of valve body carrier 40, and is limited in its displacement path relative to valve body carrier 40 by locking tongues 31. Helical spring 5 surrounds guide segment 30 of closing pin 3 and is held thereon by holding cams 35, as long as spring 5 is relaxed and therefore has its smallest inner diameter.

As is standard, filter insert 2 is made up of a filter material body 22 and end disks 21 and 22 enclosing it at the ends. Lower end disk 21 has a central mounting opening 21' by which filter insert 2 is mounted at the front onto valve body carrier 40. A valve seat 24 for a filter bypass valve 4 is integrally formed in one piece on upper end disk 22, on its downward-oriented side. In the interior of filter material body 20 there is situated a supporting lattice 23 that supports filter material body 20 against collapse during filter operation.

Valve body carrier 40 is fashioned as an oblong lattice-shaped body made of carrier struts 42 that run in the circumferential and axial direction. On the upper end of valve body carrier 40 there is integrally formed a valve body 44 that together with valve seat 24 forms filter bypass valve 4. A lower segment of valve body carrier 40 protrudes downward from filter insert 2 and forms a guide for guide segment 30 of closing pin 3. In the lower end region of closing pin 3, on this pin there are formed two radially sealing seals, axially at a distance from one another, seal 33.1 having a larger diameter and seal 33.2 having a smaller diameter.

Preassembled assembly 6 shown in FIG. 1 can for example be provided by a supplier to the manufacturer of internal combustion engines, who then provides the associated filter housing (not shown in FIG. 1) and installs assembly 6 therein.

Figure 2:
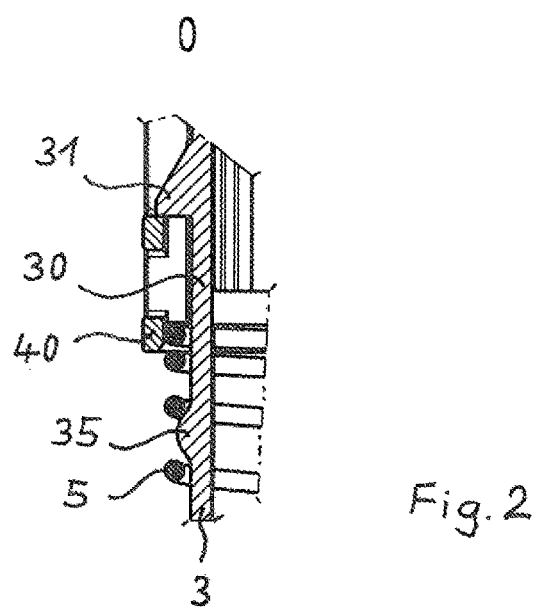

FIG. 2 shows detail O from FIG. 1 in an enlarged representation. Here, one of locking tongues 31 of closing pin 3 can be seen, situated on a part of valve body carrier 40. Around the outer circumference of guide segment 30 of closing pin 3, there runs spring 5, held there by holding cam 35.

Figure 3:
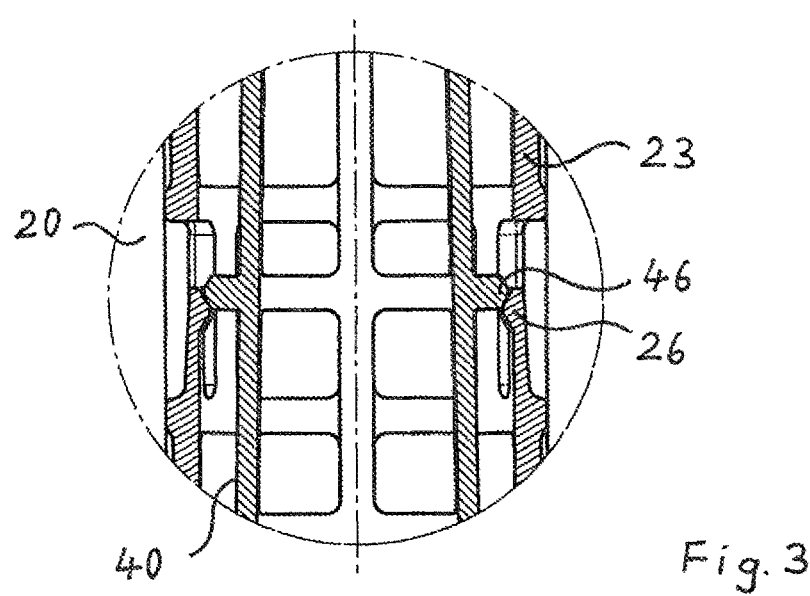

FIG. 3 shows detail N-N in an enlarged view. In the center, there is a sectional view of valve body carrier 40. On its outer circumference, there is present, as a radially protruding bulge, second locking connection means 46, which cooperate with second locking connection means 26 of filter insert 2, realized as a locking tongue, and which is part of support lattice 23 of filter insert 2.

Figure 4:
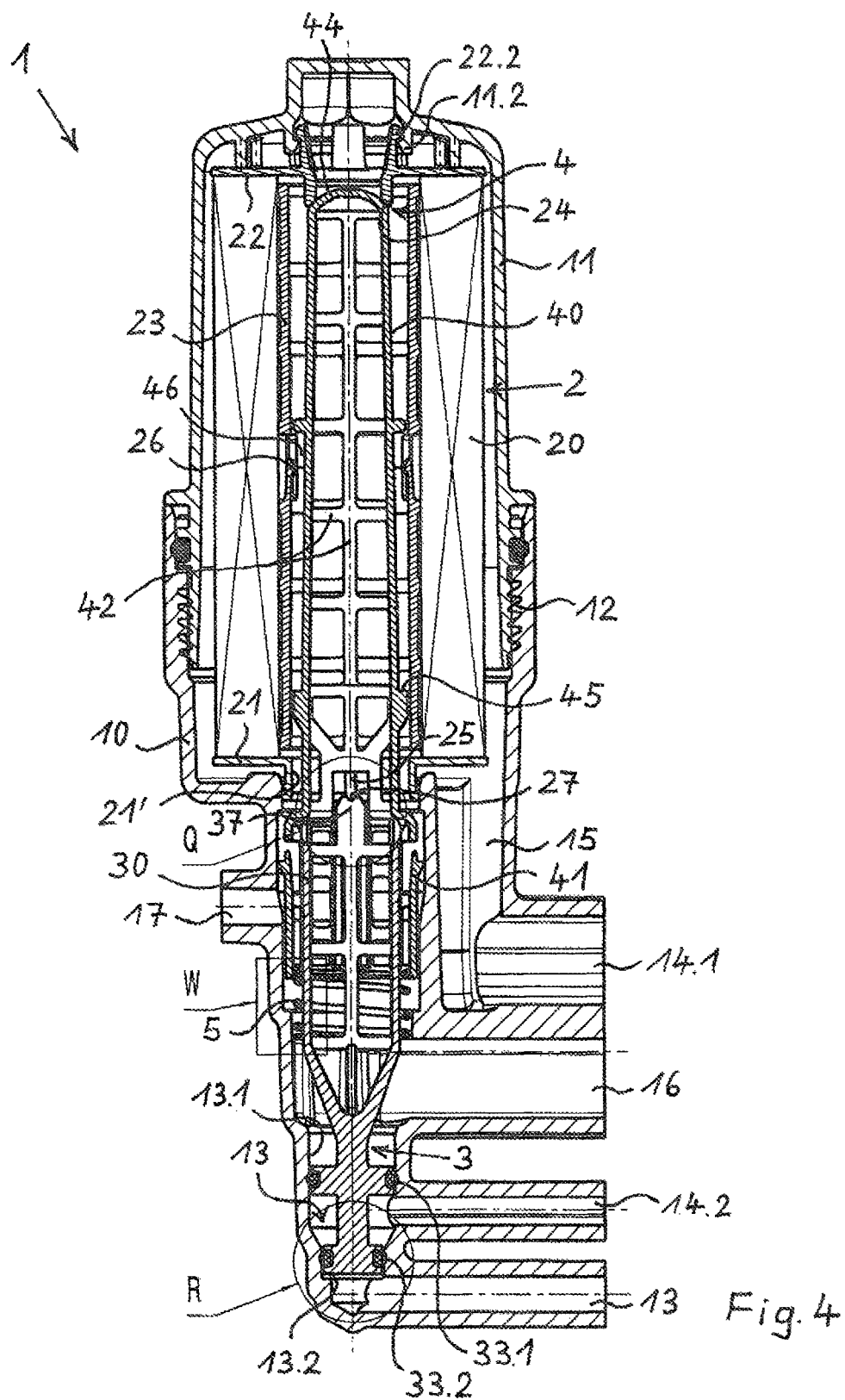

FIG. 4 shows a complete liquid filter 1 in which the preassembled assembly shown in FIG. 1 is completely assembled into a filter housing 10. Housing 10 and cover 11 are fashioned with a cooperating screw threading 12, which in FIG. 4 is screwed completely shut. Via its own positioning guide means 25 and positioning guide means 45 in the form of two chamfers on valve body carrier 40 in the circumferential direction, meeting one another obliquely running from top to bottom, filter insert 2 is brought into a particular position in which actuating elements 27 of filter insert 2 move into axial counterposition to pusher lugs 37 of closing pin 3. Via actuating elements 27, a thrust force is exerted on pusher lugs 37 that brings closing pin 3 into its closed position in filter housing 10, shown in FIG. 4.

In its lower part, filter housing 10 has a number of channels that are used for the supply and carrying off of liquids. Via a raw liquid inlet 15, unfiltered liquid is guided to the raw side of liquid filter 1, situated radially outwardly from filter insert 2. In raw liquid inlet 15, the liquid here flows via a first connecting channel 14.1 that connects liquid filter 1 to a heat exchanger (not shown) such as an oil cooler. Via a clean liquid outlet 16, filtered liquid that flows downward from the clean side of liquid filter 1, i.e., from a region inside filter insert 2, exits filter housing 10.

At the very bottom of filter housing 10 there is a central discharge duct 13 in which the two seals 33.1 and 33.2 of closing pin 3 are situated. A second connecting channel 14.2 connects the heat exchanger to a region of central discharge duct 13 between the two seals 33.1 and 33.2.

Central discharge duct 13 has two segments, 13.1 having a larger diameter and 13.2 having a smaller diameter, in which seals 33.1 and 33.2 are situated in their sealing position, i.e., in the closed position of closing pin 3. In this way, discharge duct 13 is sealed in liquid-tight fashion.

During operation of liquid filter 1, the liquid pressure prevailing therein ensures that closing pin 3 is held in its lowermost position.

Spring 5 is supported with its lower end on filter housing 10 and with its upper end on the underside of valve body carrier 40, and exerts an upward-directed force on this valve body carrier. This force presses valve body 44 of filter bypass valve 4 into its closed position against valve seat 24, as long as a liquid pressure difference between the raw side and the clean side remains below a threshold value. Inside filter housing 10, valve body carrier 40 is guided so as to be capable of limited axial displacement; a limitation of the displacement path upward is formed by a flexible cam system 41, which does permit insertion of valve body carrier 40 from above into a corresponding central opening of filter housing 10, but prevents valve body carrier 40 from being withdrawn from filter housing 10.

Figure 5:
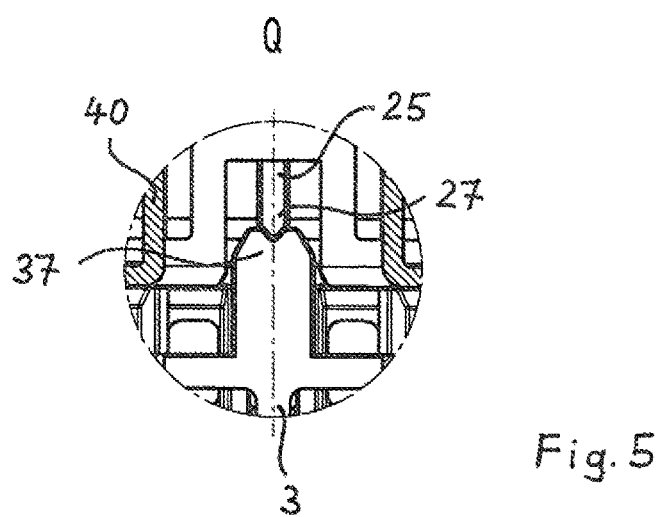

FIG. 5 shows detail Q from FIG. 4, in an enlarged representation. Here it can be seen particularly clearly that actuating element 27 exerts a thrust force, in the axial direction, on pusher lug 37 of closing pin 3.

Figure 6:
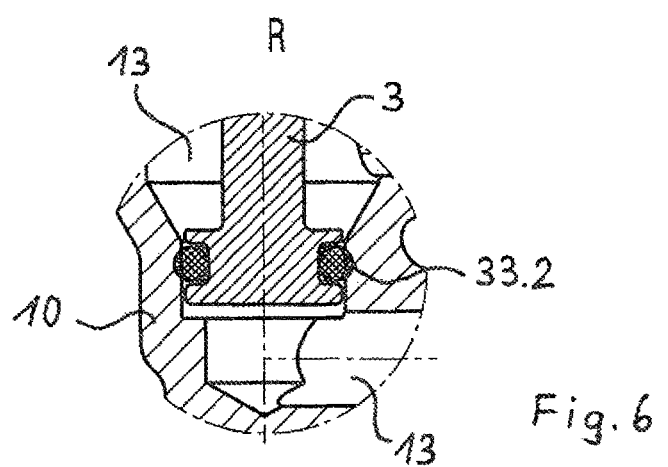

FIG. 6 shows detail R from FIG. 4 in an enlarged representation, in which the cooperation of second seal 33.2 of closing pin 3 with discharge duct 13 in filter housing 10 can be seen clearly. The lower end of closing pin 3 still has a small distance from a step in filter housing 10; when the liquid filter is commissioned, a liquid pressure arises above closing pin 3, which ensures that closing pin 3 moves, with its lower end underneath seal 33.2, until reaching a stop on housing 10.

Figure 7:
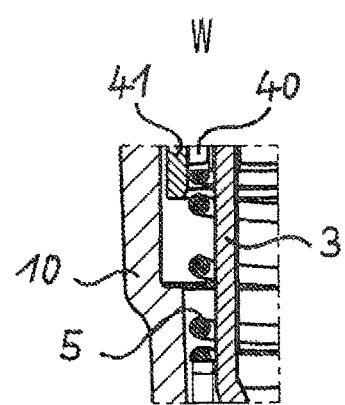

FIG. 7 shows detail W from FIG. 4 in an enlarged view. Here it can be seen in particular how helical spring 5 is supported with its lower side on filter housing 10 and with its upper side on valve body carrier 40.

Figure 8:
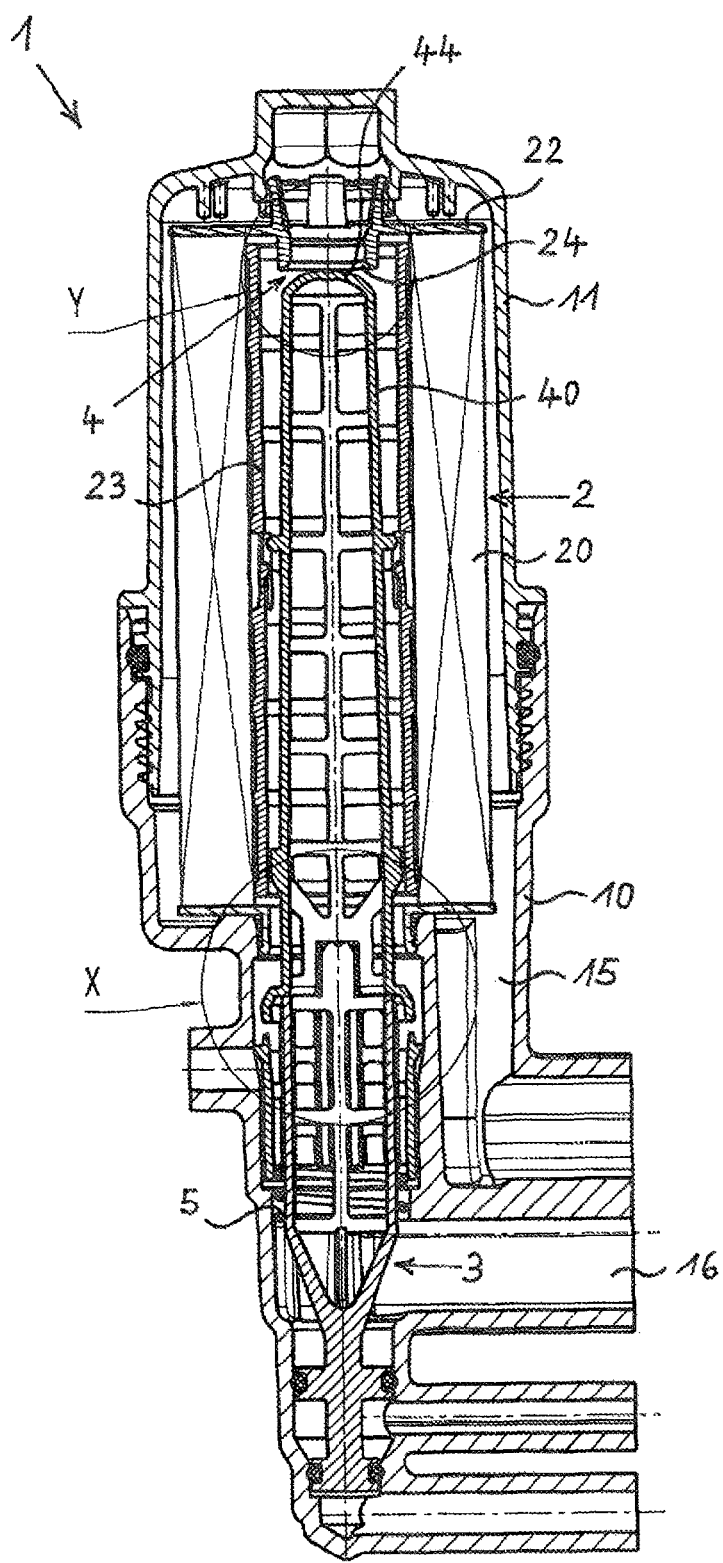

FIG. 8 shows previously described liquid filter 1, now in a state in which filter bypass valve 4 is open. This open position of filter bypass valve 4 occurs when there arises between the raw side, connected to raw liquid inlet 15, and the clean side, connected to clean liquid outlet 16, of liquid filter 1 a pressure difference that exceeds a boundary value, for example as a result of a clogging of filter material body 20 with filtered-out dirt particles. The force produced by the pressure difference presses on the upper side of valve body 44, and thus moves valve body carrier 40 against the force of spring 5 in the opening direction, i.e., downward. In this way, valve body 44 comes to be situated at a distance from its valve seat 24 on upper end disk 23 of filter insert 2. An immediate flow path is now open from the raw side to the clean side of liquid filter 13. During the opening movement of valve body carrier 40 with valve body 44, closing pin 3 maintains its position unchanged.

Figure 9:
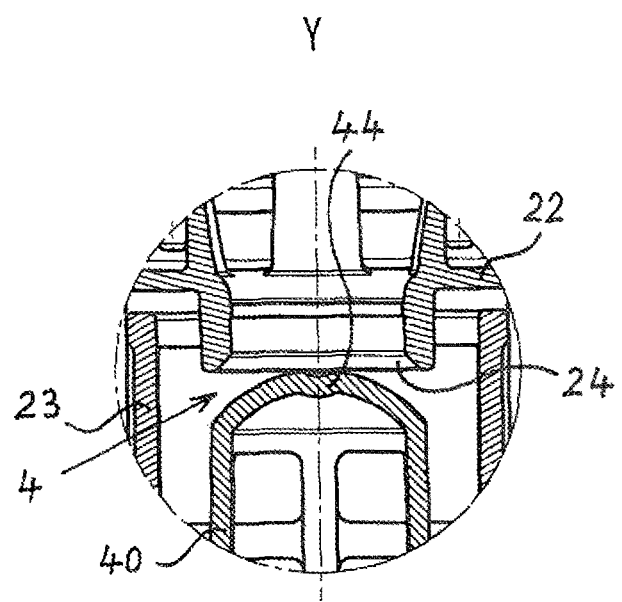

FIG. 9 shows detail Y from FIG. 8, in which open filter bypass valve 4 is shown in an enlarged view. At the bottom, the upper end of valve body carrier 40 with valve body 44 is visible. At the top in FIG. 9, there is situated upper end disk 22 of filter insert 2 with its valve seat 24. Here, valve body 44 is moved away from valve seat 24, and filter bypass valve 4 is open.

Figure 10:
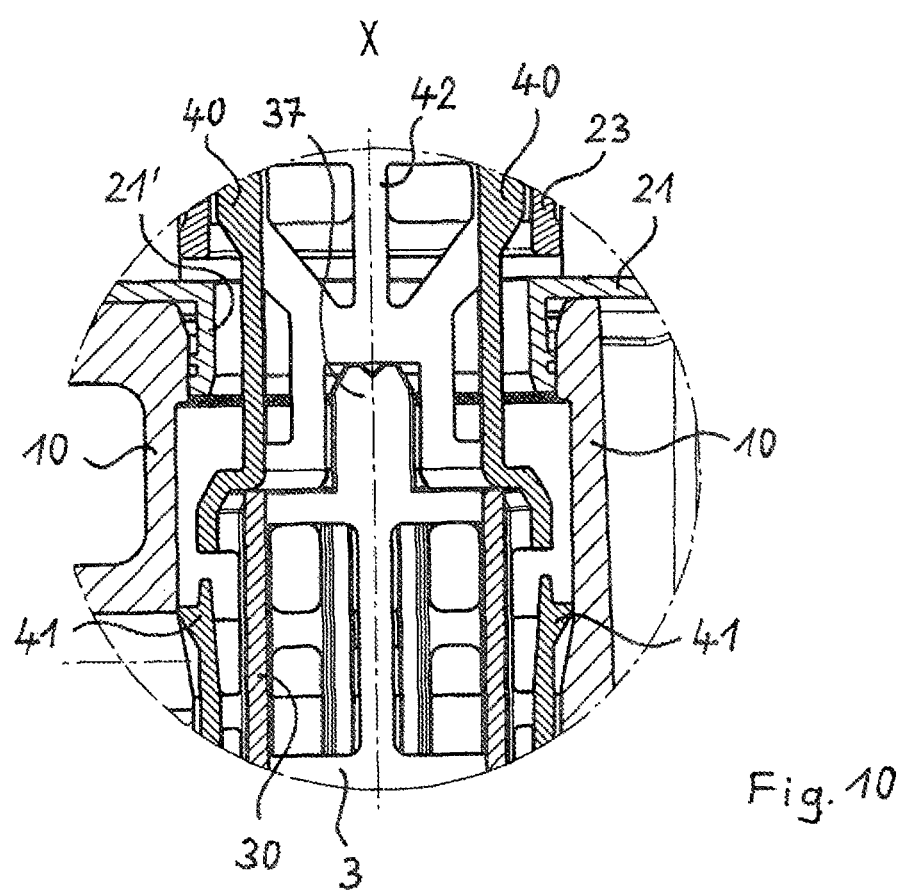

FIG. 10 shows detail X from FIG. 8, in an enlarged view. At the left and at the right, a small part of filter housing 10 can be seen, in whose central opening lower end disk 21 of filter insert 2 is inserted in sealing fashion. At the same time, filter insert 2 is mounted, with central mounting opening 21', onto valve body carrier 40, which runs from below to above into filter insert 2. At bottom in FIG. 10, the upper part of guide segment 30 of closing pin 3 is visible, whose uppermost end is formed by pusher lug 37. Radially outside guide segment 30, cam system 41 of valve body carrier 40 is also visible.

Figure 11:
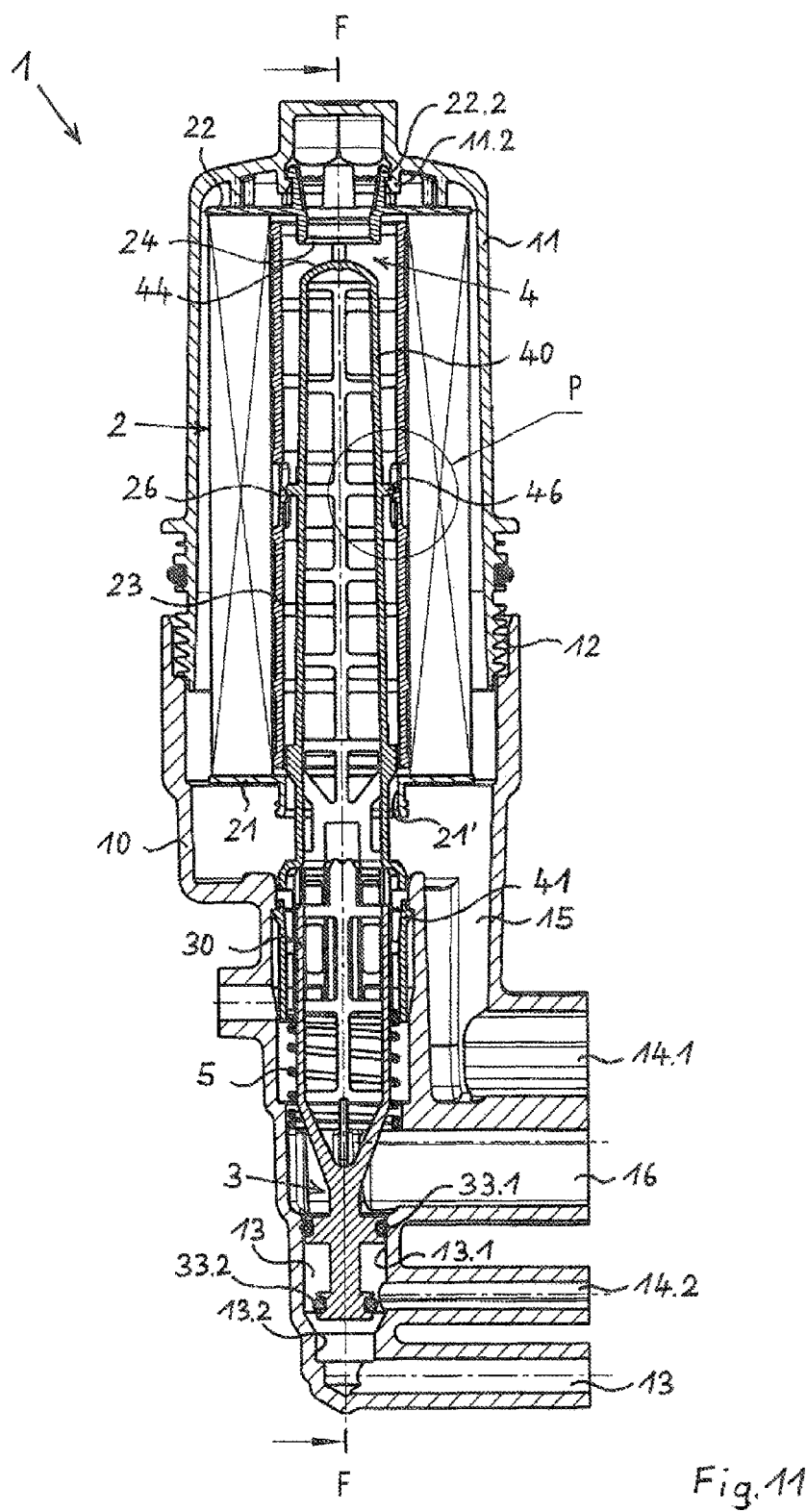

FIG. 11 shows liquid filter 1 during a maintenance session, during which cover 11 is screwed off from filter housing 10. Filter insert 2 is lifted out along with it via locking connecting means 11.2 and 22.2.

Spring 5 pushes valve body carrier 40, which is now relieved of stress axially at its upper side due to the removal of cover 11, upward until its cam system 41 meets the associated step of filter housing 10, thereby preventing further displacement of valve body carrier 40 upward. Via locking tongues 31, described on the basis of FIGS. 1 and 2 and not visible in FIG. 11, closing pin 3 is concomitantly moved upward by valve body carrier 40. In this way, lower seal 33.2 moves out of segment 13.2 of discharge duct 13 having the smaller diameter into segment 13.1 of discharge duct 13 having the larger diameter, thus causing seal 33.2 to become free of filter housing 10 and to no longer seal. Upper seal 33.1 remains inside segment 13.1 of discharge duct 13 having the larger diameter, and thus continues to seal.

Figure 12:
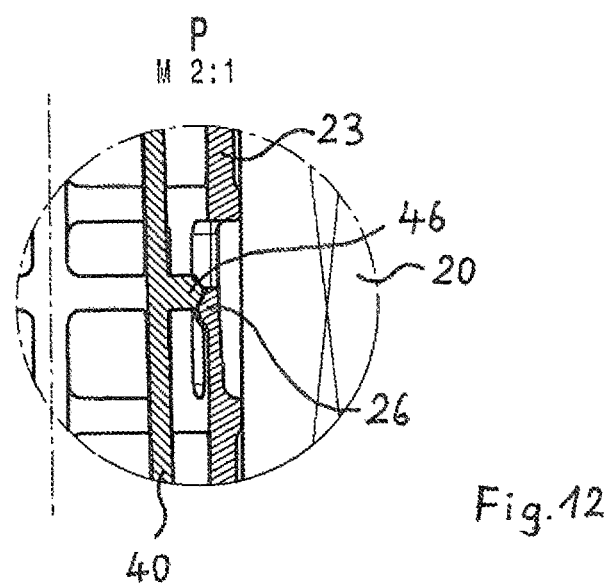

In FIG. 12, detail P from FIG. 11 is shown in an enlarged view. Here, in particular the cooperation of the second locking connecting means 26 and 46 is clear.

Figure 13:
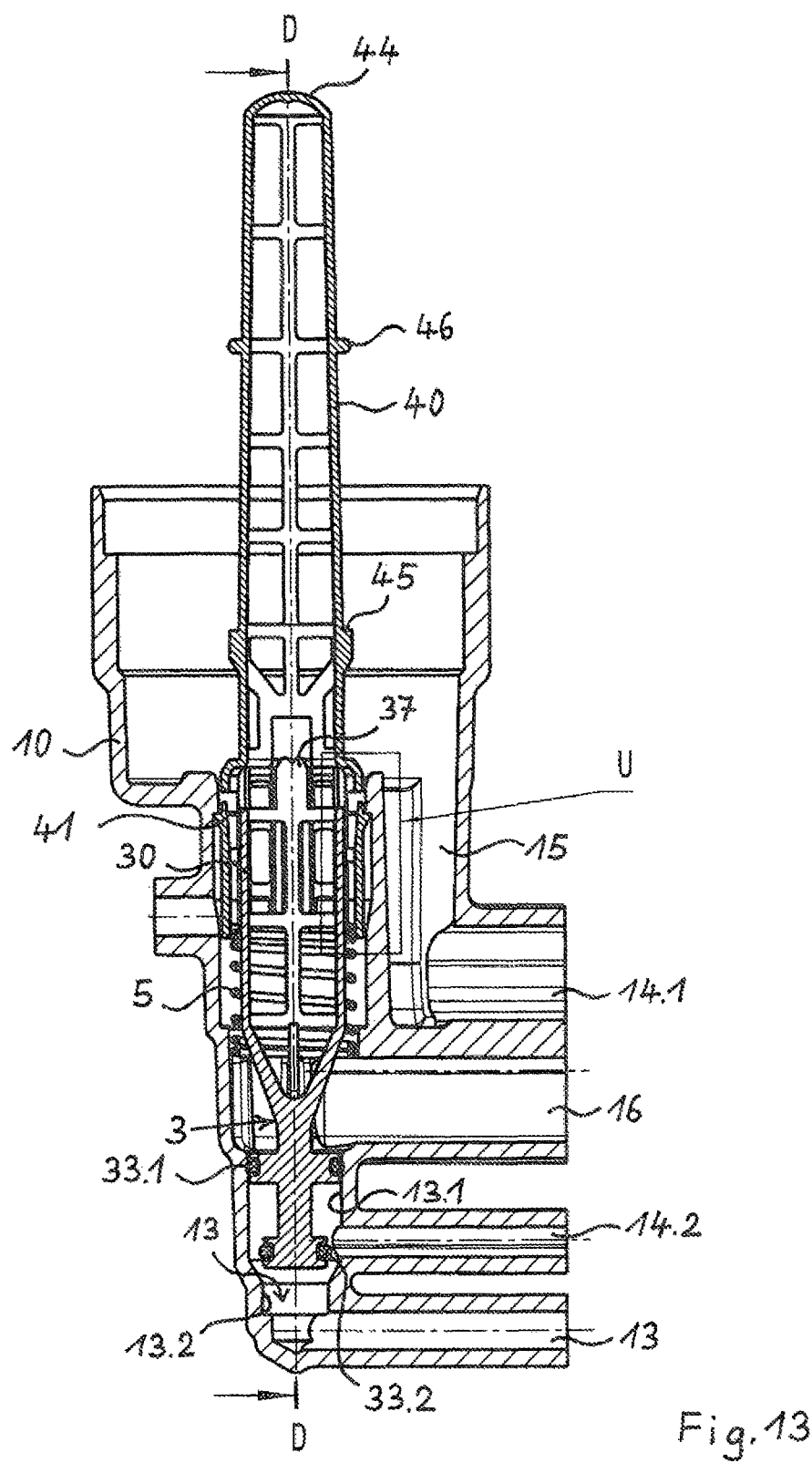

FIG. 13 shows the state after the removal of cover 11 and the removal of filter insert 2, connected thereto, from filter housing 10. Spring 5 now presses valve body carrier 40 upward up to the stop point of its cam system 41 on filter housing 10. Closing pin 3, carried along upward by the valve body carrier 40, continues to be in its open position. When closing pin 3 is in the open position, liquid in filter housing 10 flows through raw liquid inlet 15, through first connecting channel 14.1 and through the heat exchanger connected thereto (not shown here), via second connecting channel 14.2, past lower seal 33.2, through discharge duct 13, and, in the case of an oil filter, preferably into the oil pan of an associated internal combustion engine.

Figure 14:
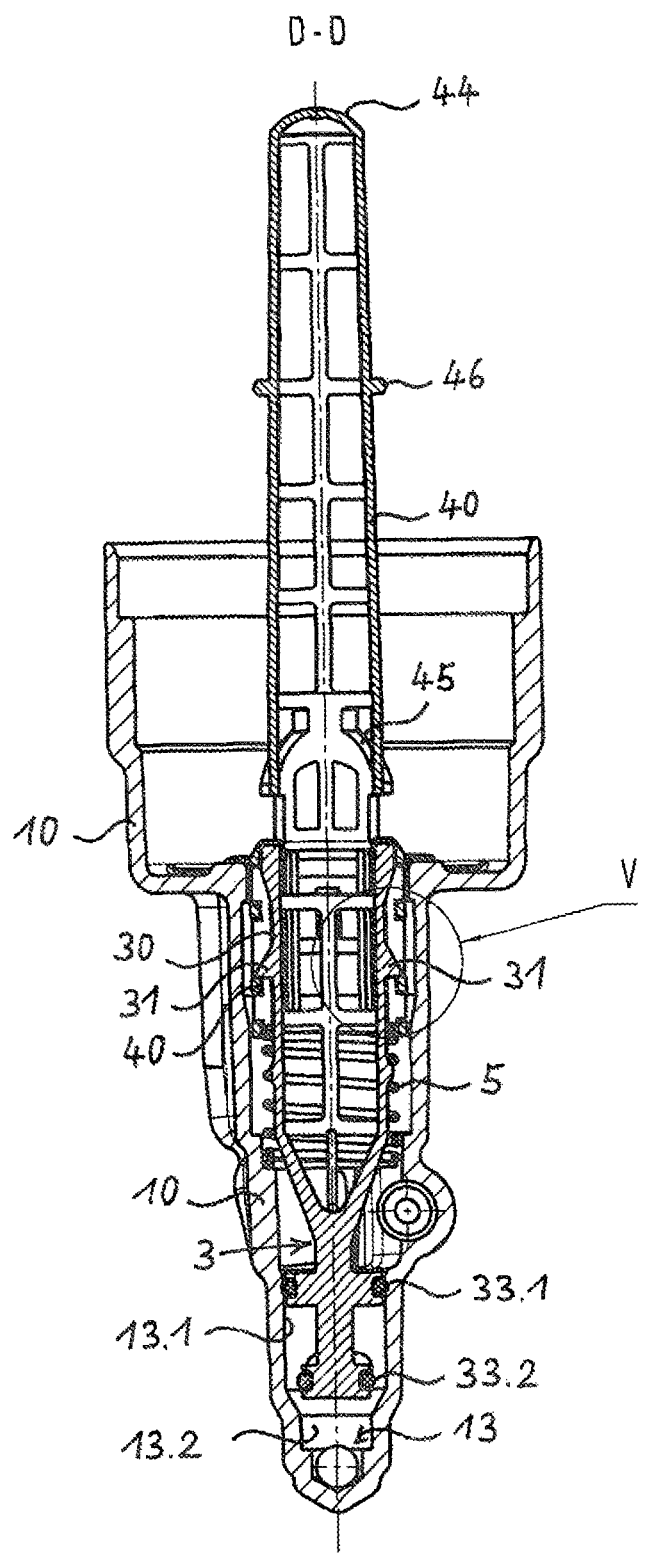

FIG. 14 shows the partly disassembled liquid filter of FIG. 13, in a longitudinal section rotated by 90°. In the lower part of filter housing 10 there is again situated closing pin 3 with its two seals 33.1 and 33.2, of which the latter stands free from filter housing 10 and thus releases discharge duct 13. Guide segment 30, forming the upper part of closing pin 3, is guided axially in the lower part of valve body carrier 40, where the capacity for relative axial displacement is limited by locking tongues 31. Moreover, locking tongues 31 provide rotational securing of closing pin 3 and valve body carrier 40 relative to one another. On the part of valve body carrier 40 situated above guide segment 30, its positioning guide means 45 can be seen, in the form of the chamfers running over its outer circumference and falling off in opposite directions.

Figure 15:
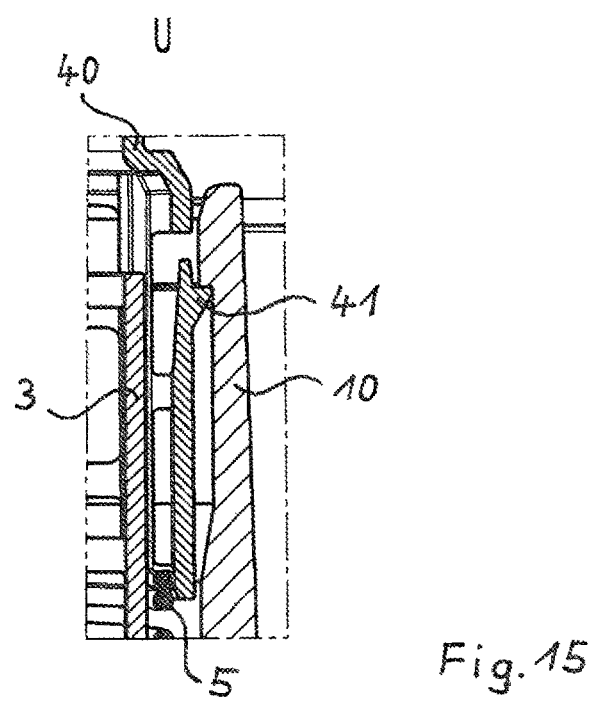

FIG. 15 shows detail U from FIG. 13 in an enlarged view, in which in particular it can be seen that cam system 41 lies against the associated step of filter housing 10.

Figure 16:
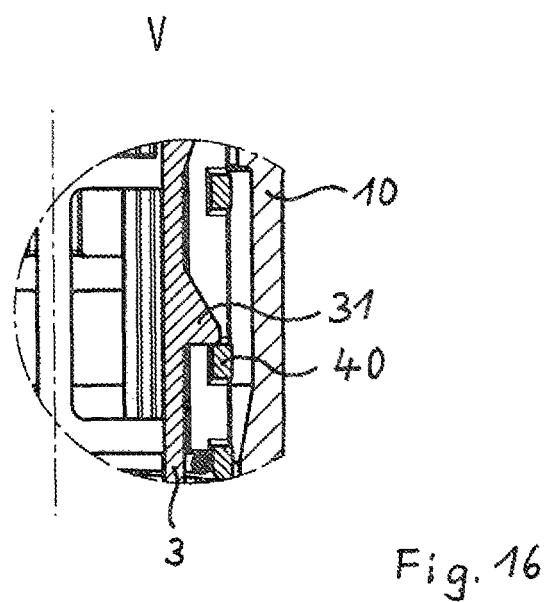

FIG. 16 shows detail V from FIG. 14 in an enlarged view. Here the interaction of locking tongues 31 with valve body carrier 40 can be seen clearly, whereby closing pin 3 is carried along upward when there is an upward movement of valve body carrier 40.

Figure 17:
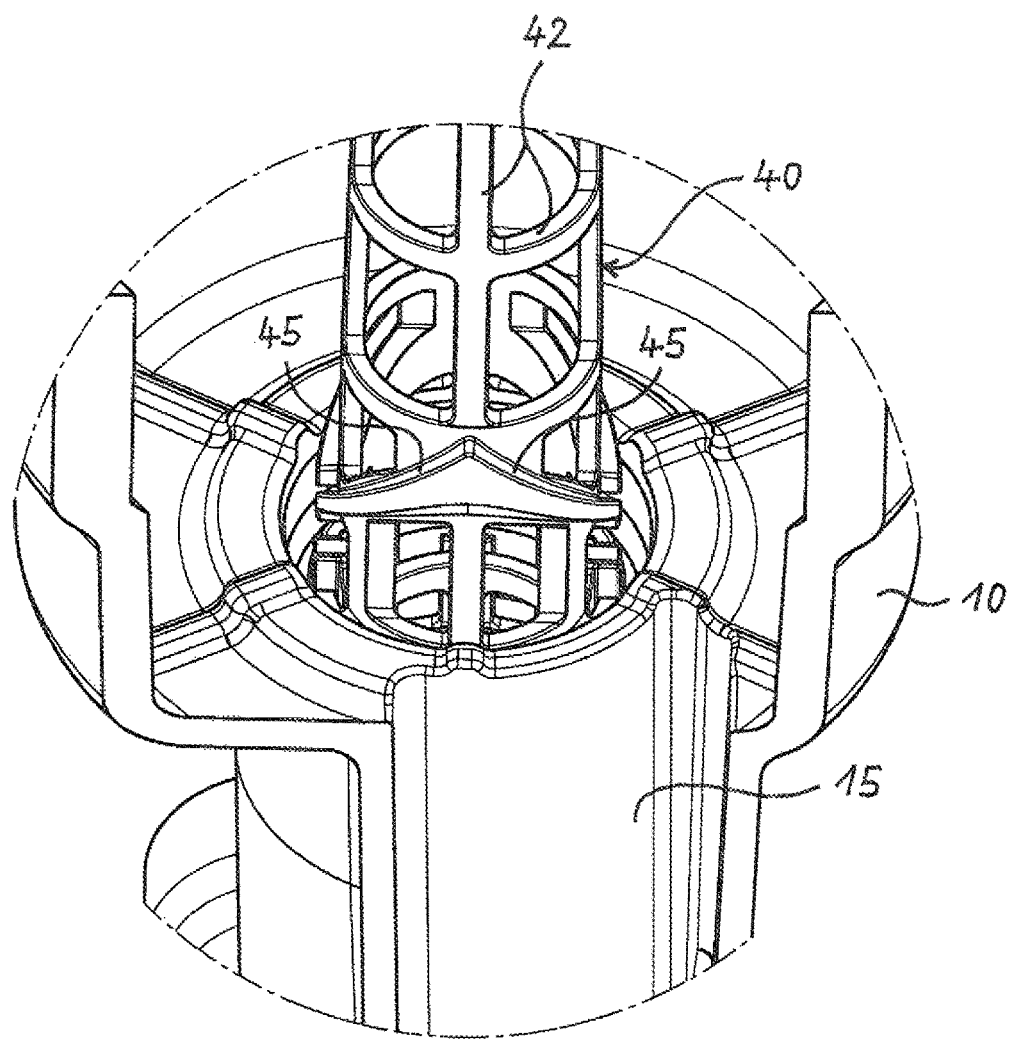

FIG. 17 shows, in a partially broken-away perspective view, filter housing 10 together with valve body carrier 40 inserted therein. Facing the observer, on the side of housing 10 raw liquid inlet 15 running therein can be seen. On the valve body carrier 40, facing the observer positioning guide means 45 can be seen, which force-guide positioning guide means 25 on filter insert 2, which here are at the same time actuating elements 27, into a position in the circumferential direction ready for engagement with pusher lugs 37 of closing pin 3.

Figure 18:
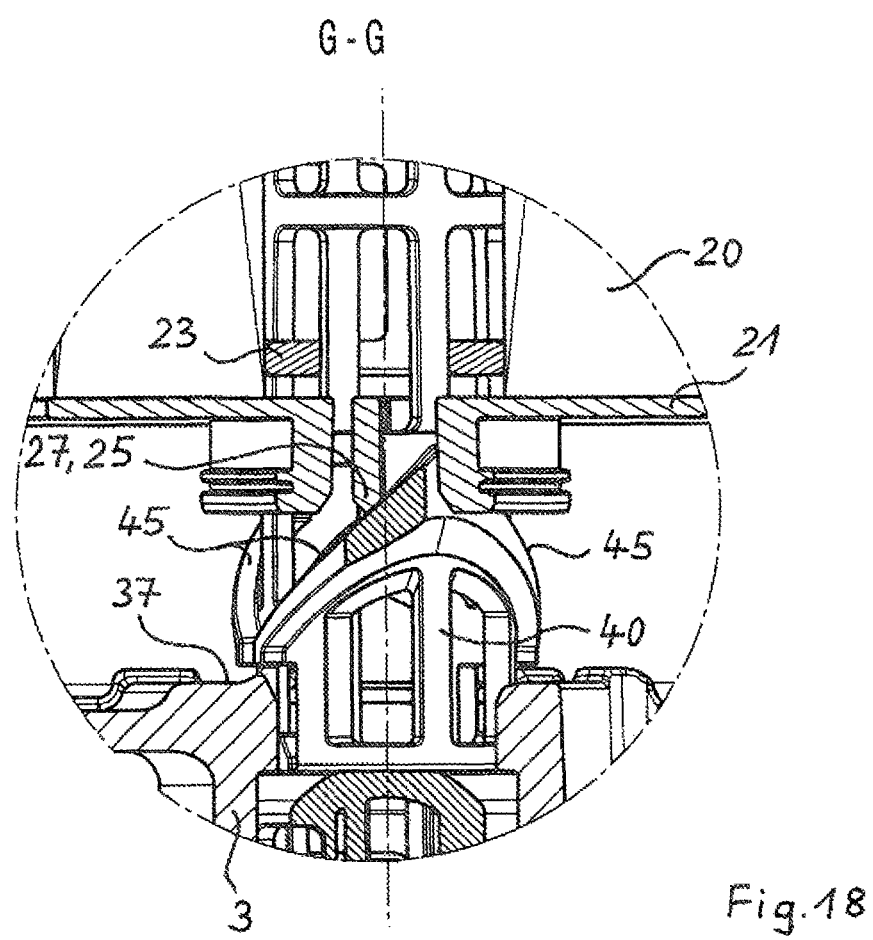

FIG. 18 shows an enlarged segment of liquid filter 1 in eccentric longitudinal section. At the top in FIG. 18, a part of filter material body 20, lower end disk 21, and supporting lattice 23 of filter insert 2 can be seen. Filter insert 2 is shown in a state during its placement onto valve body carrier 40, where filter insert 2, seen in the circumferential direction, has not yet reached its engagement-ready position relative to closing pin 3. Rather, positioning guide means 25 of filter insert 2 have been placed from above, in the axial direction, into an intermediate position onto positioning guide means 45 of valve body carrier 40. Subsequently, filter insert 2 rotates in the clockwise direction and at the same time moves further downward, and positioning guide means 25 slide onto positioning guide means 45. At the end of this movement, positioning guide means 25, which at the same time form actuating elements 27, are situated in fitting counterposition to pusher lugs 37 on closing pin 3.

Figure 19:
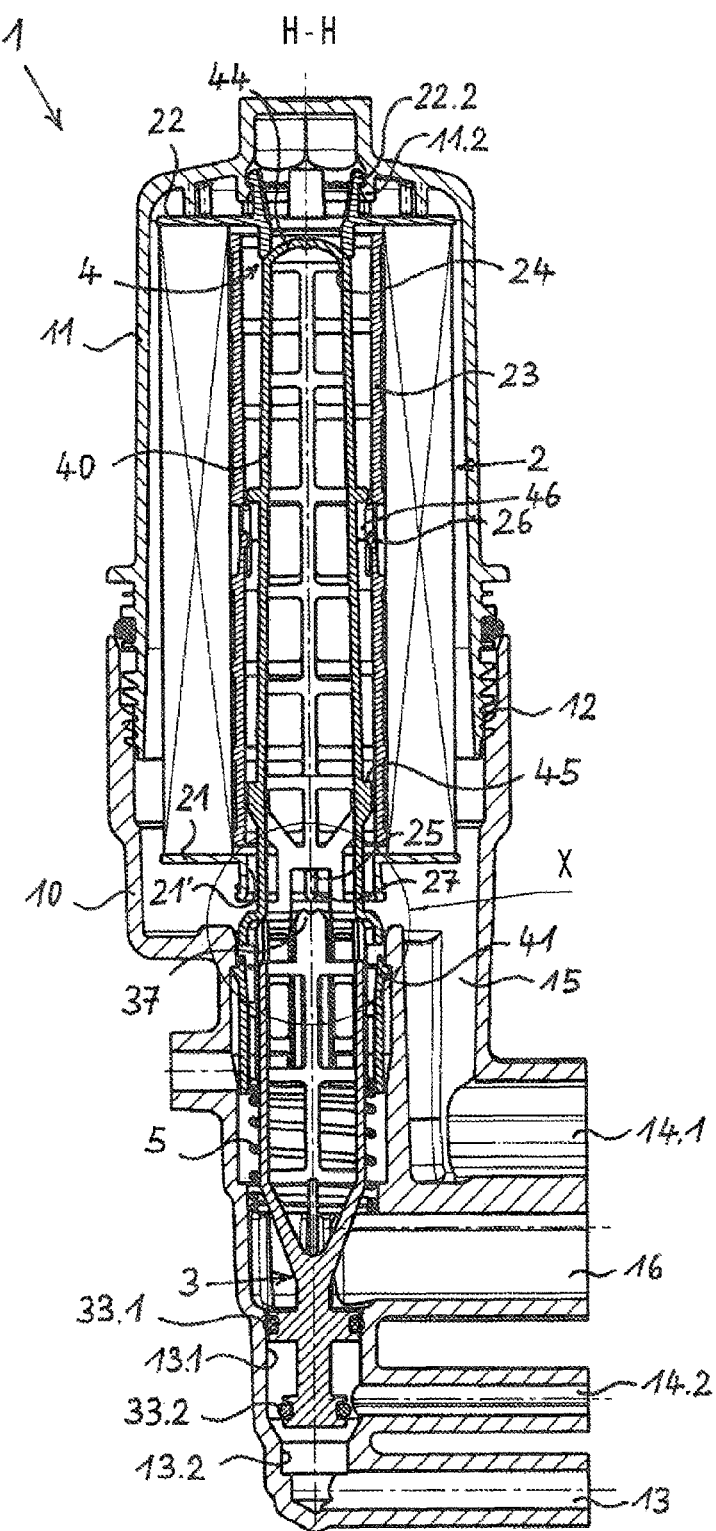

FIG. 19 shows liquid filter 1 in a state at the beginning of assembly after a filter maintenance. Cover 11 of filter housing 10, together with filter insert 2 locked thereto, is screwed to a small extent into screw threading 12. In this state, actuating elements 27 of filter insert 2 are still at an axial distance from pusher lugs 37 of closing pin 3. Valve body carrier 40 is still in its position pushed out upward by spring 5, in which its cam system 41 lies against filter housing 10. Closing pin 3, carried along upward by valve body carrier 40, is also still in its raised opening position, in which it is held by the friction of upper seal 33.1.

Figure 20:
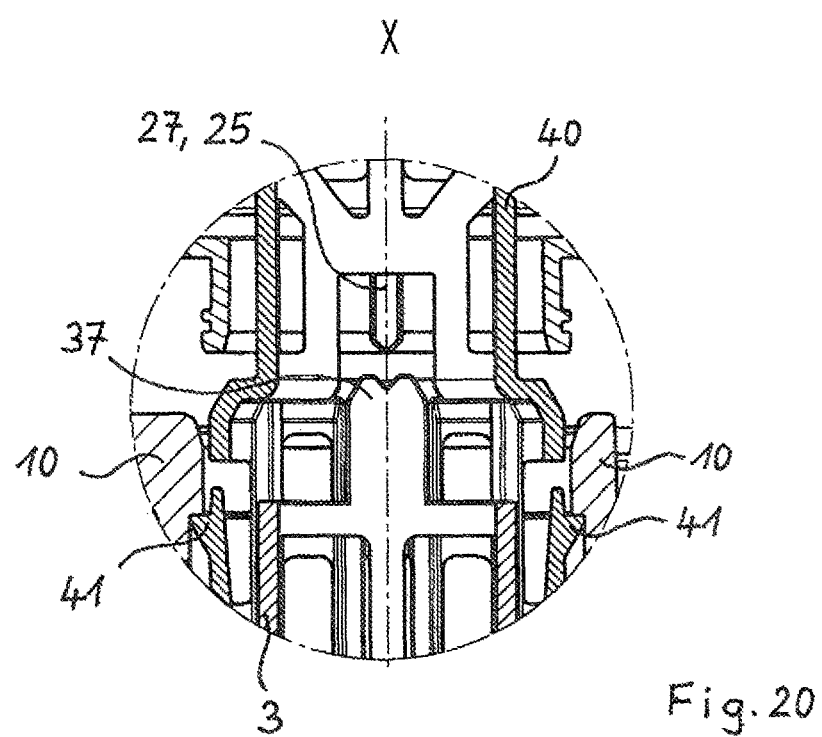

FIG. 20 shows detail X from FIG. 19 in an enlarged view, such that on the one hand the stop of cam system 41 on filter housing 10 and on the other hand the axial distance between actuating elements 27 and pusher lugs 37 is clear.

Figure 21:
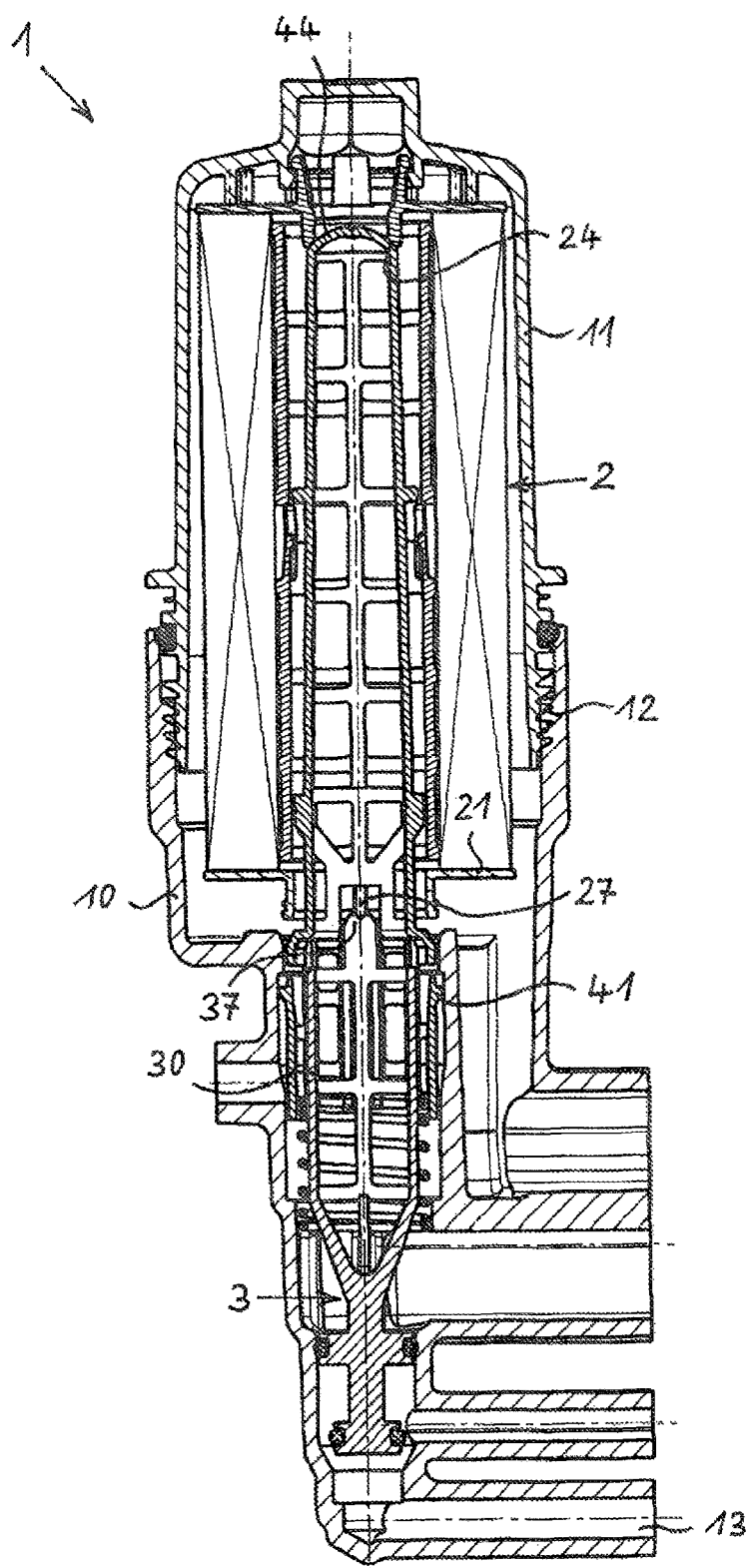

FIG. 21 shows liquid filter 1 from FIG. 19, now in a state after cover 11 has been screwed somewhat further into filter housing 10. In the state shown in FIG. 21, actuating elements 27 are now just axially seated on pusher lugs 37. Valve body carrier 40 has already been moved concomitantly downward by a small distance through the seating of valve body 44 on sealing seat 24, which can be seen in that now cam system 41 already has a slight axial distance downward from the associated step in filter housing 10. The movement of cover 11 downward has still not been transmitted to closing pin 3.

After further screwing of cover 11 into filter housing 10 up to the stop point, there results the state of liquid filter 1 shown in FIG. 4, in which closing pin 3 is again in its closing position.

Figure 22:
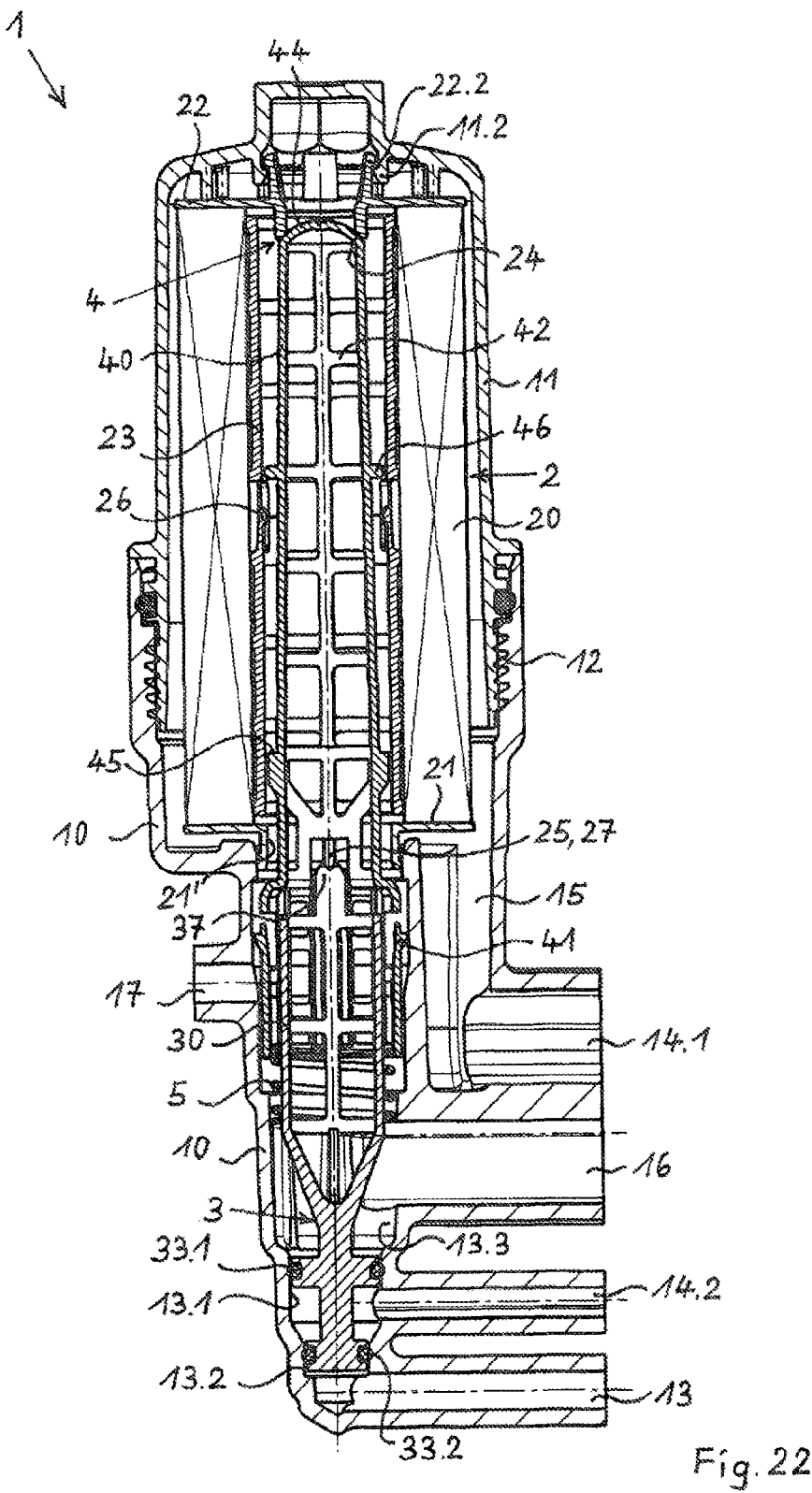
FIGS. 22 and 23 show a second exemplary embodiment in two different operating states.
Figure 23:
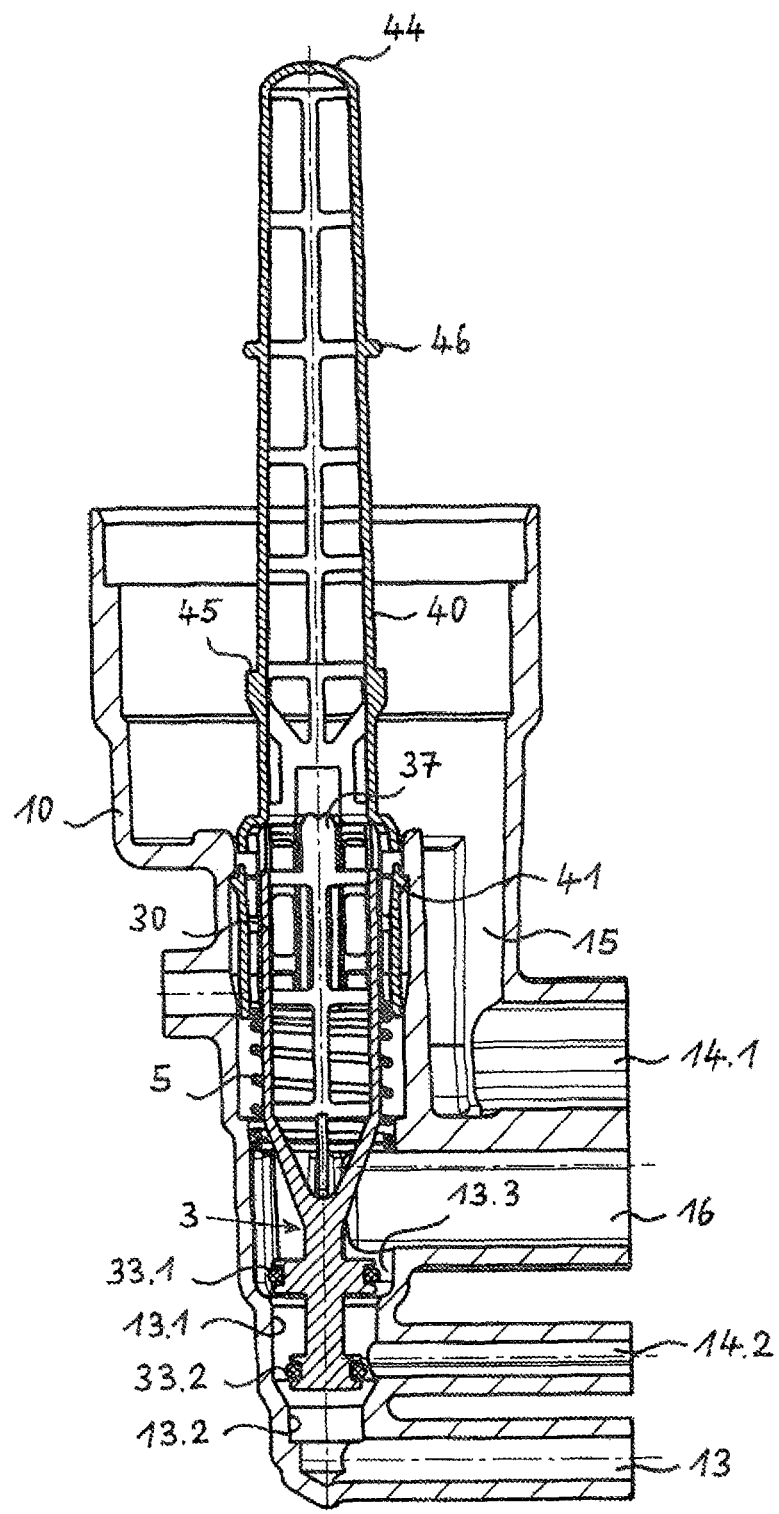

FIGS. 22 and 23 show a second exemplary embodiment, modified compared to the example shown in the preceding Figures. Differing from the first example, filter housing 10 of liquid filter 1 according to FIGS. 22 and 23 has, in discharge duct 13, a third segment 13.3 that is situated above segments 13.1 and 13.2 and that has the largest inner diameter compared to the two segments 13.1 and 13.2. This segment 13.3 terminates upwardly at segment 13.1.

In the closing position of closing pin 3, as is present in the normal operation of the liquid filter, seal 33.1 is situated in sealing fashion in segment 13.1 and seal 33.2 is situated in sealing fashion in segment 13.2 of discharge duct 13.

FIG. 23 shows the liquid filter from FIG. 22 after the removal of cover 11 and removal of filter insert 2. In this state, spring 5 presses valve body carrier 40 upward until the stop point of its cam system 41 on filter housing 10, whereby valve body carrier 40 also carries closing pin 3 upward into its uppermost position. In this uppermost position of closing pin 3, upper seal 33.1 is situated freely in segment 13.3 and lower seal 33.2 is situated freely in segment 13.1 of discharge duct 13. In this way, a runoff path for liquid is released from filter housing 10 through its central opening along the lower part of valve body carrier 40 and along closing pin 3, past its two seals 33.1 and 33.2, into discharge duct 13. Parallel to this, another part of the liquid can flow through raw liquid inlet 15, first connecting channel 14.1, an associated heat exchanger (not shown here), a second connecting channel 14.2 coming from the heat exchanger, past lower seal 33.2, into discharge duct 13. In addition, on this second path the heat exchanger is also emptied during the filter maintenance.

In all further individual parts and functions, liquid filter 1 according to FIGS. 22 and 23 corresponds to the previously explained exemplary embodiment, to whose description reference is made.

Figure 24:
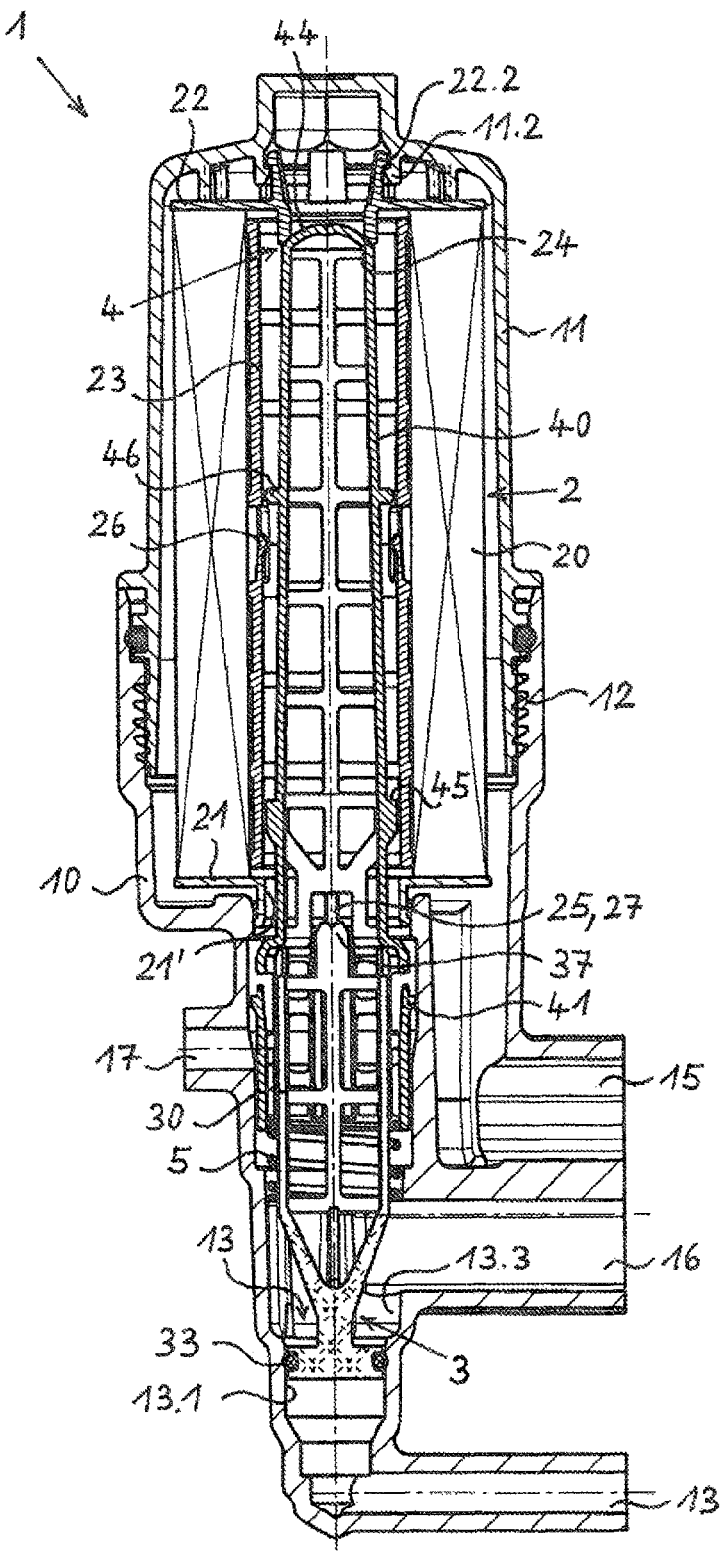
FIGS. 24 and 25 show a third exemplary embodiment in two different operating states.
Figure 25:
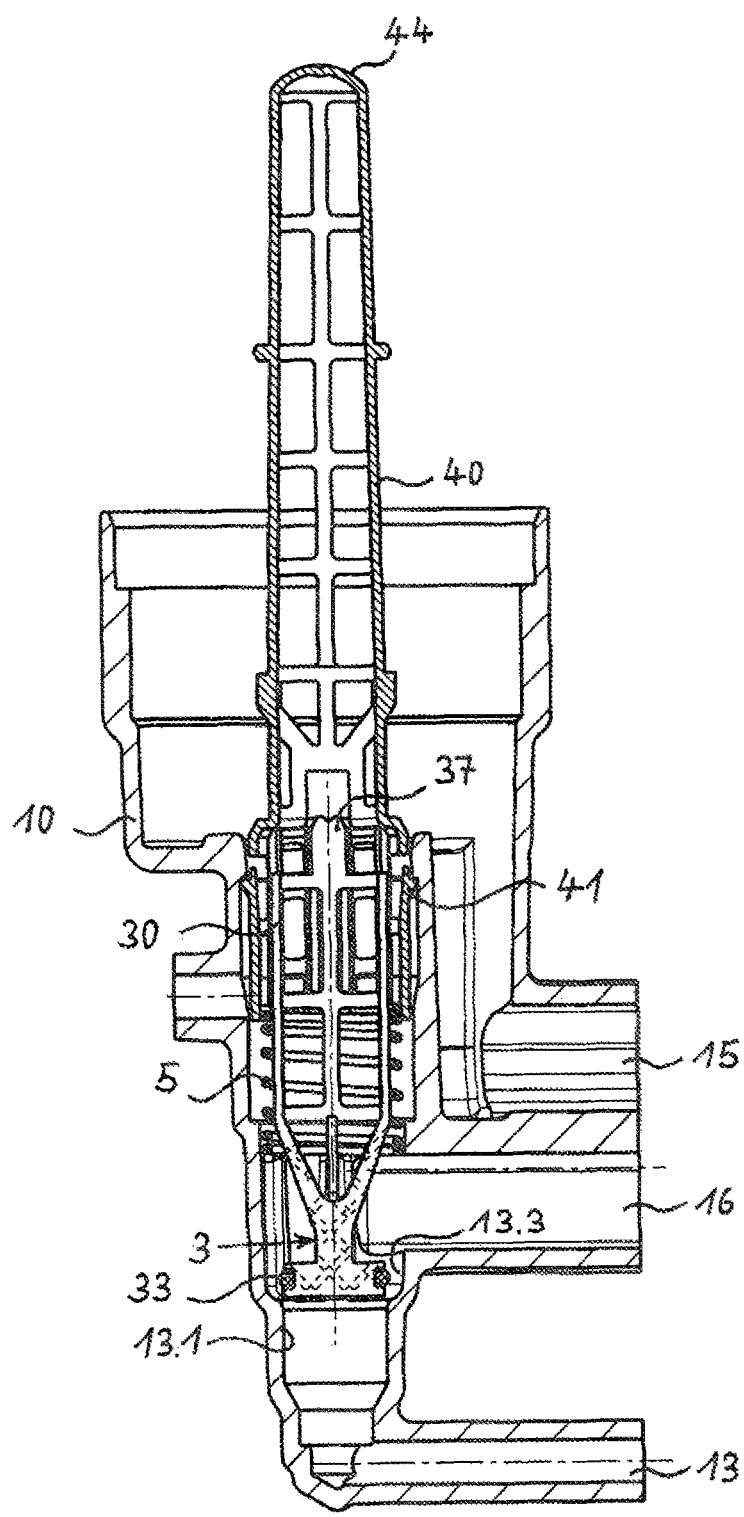

A third exemplary embodiment of the present invention is shown in FIGS. 24 and 25. Characteristic for this embodiment of liquid filter 1 is that here closing pin 3 has only one radially sealing seal 33, and that discharge duct 33 in filter housing 10 has only two segments 13.1 and 13.3 for cooperation with seal 33.

In FIG. 24, liquid filter 1 is shown in its operating position in which filter insert 2 is installed in filter housing 10 and cover 11 is screwed tightly onto filter housing 10. In this state, as in the examples described above, actuating elements 27 press against pusher lugs 37 of closing pin 3, and in this way move it downward, or holds it in its lower position. In this position, seal 33 is situated in sealing fashion in segment 13.1 of discharge duct 13, which is sealed in liquid-tight fashion thereby. Liquid that is to be filtered moves through raw liquid inlet 15 into liquid filter 1, and leaves the filter, after flowing through filter material body 20 of filter insert 2, through clean liquid outlet 16. Here, a heat exchanger is not assigned to liquid filter 1.

In FIG. 25, the liquid filter is shown from FIG. 24 after removal of cover 11 and removal of filter insert 2. Here as well, spring 5 has now pressed valve body carrier 40 upward until the stop of its cam system 41 on filter housing 10. Via locking tongues system 31, shown and explained in FIGS. 1, 2, 14, and 16, and not visible in FIG. 25, closing pin 3 is carried along upward, into its uppermost position shown in FIG. 25. In this position, seal 33 is situated freely in segment 13.3 of discharge duct 13, so that this duct is open. Liquid in filter housing 10 can in this way flow through the central opening of housing 10, along the lower part of valve body carrier 40, and along closing pin 3, past seal 33, through discharge duct 13.

In all further individual parts and functions, liquid filter 1 according to FIGS. 24 and 25 corresponds to the previously explained exemplary embodiments, to whose description reference is made.

FIGS. 26 through 33 of the drawing show a fourth exemplary embodiment of liquid filter 1. For this example, it is characteristic that it does not have any positioning guide means on filter insert 2 and on the valve body carrier 40. Here, actuating elements 27 on the lower side of lower end disk 21 of filter insert 2 are fashioned as annular circumferential collars that, in any rotational position of filter insert 2 relative to valve body carrier 40 and to closing pin 3, enter into engagement with pusher lugs 37 thereof.

Figure 26:
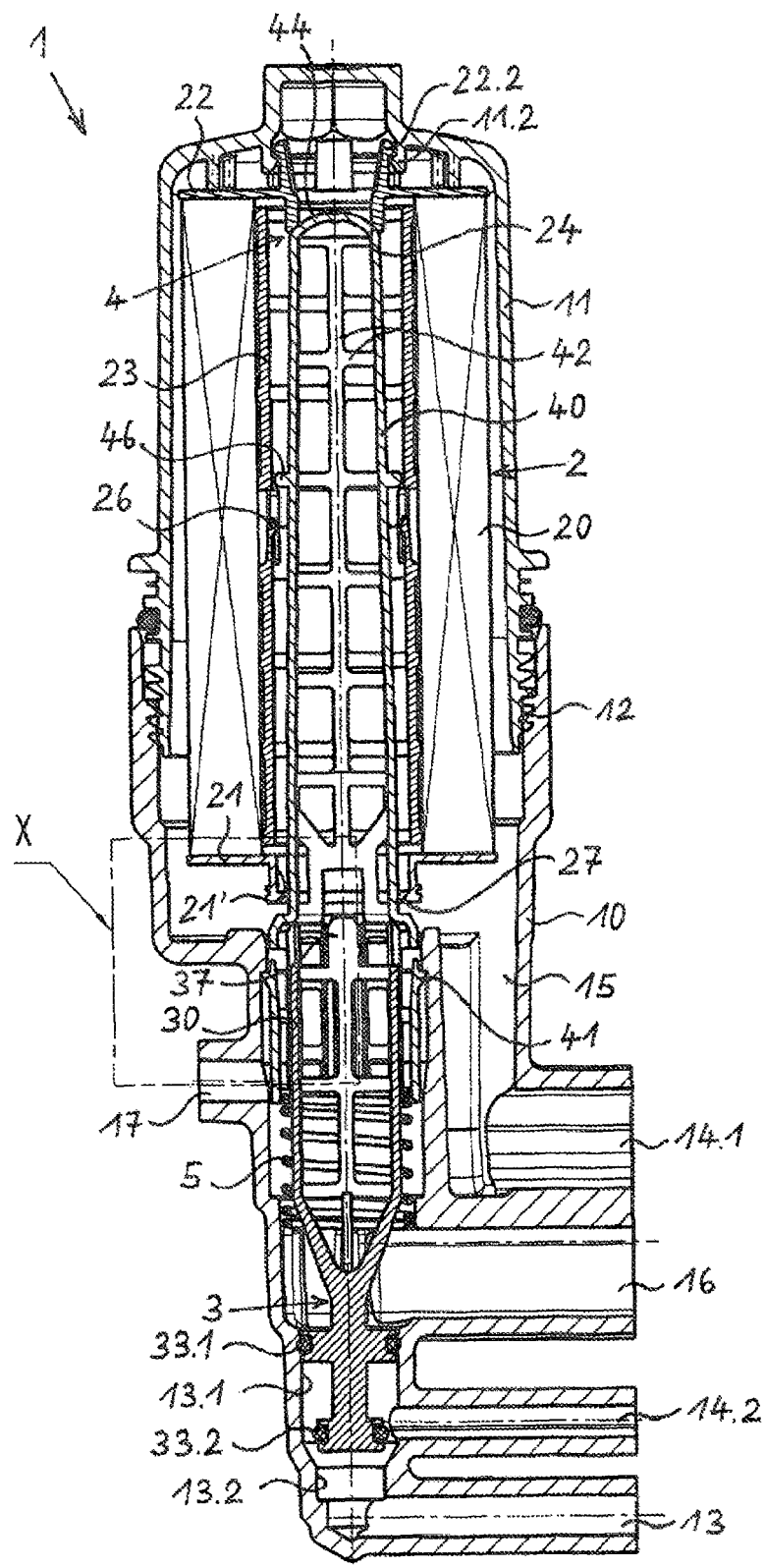
FIG. 26 through FIG. 33 show a fourth exemplary embodiment in various representations and various operating states.

In FIG. 26, liquid filter 1 is shown in a state at the beginning of assembly in the context of maintenance after fastening a fresh filter insert 2 in cover 11 and after an initial screwing of cover 11 into filter housing 10. Due to the previous removal of cover 11 and removal of filter insert 2, closing pin 3 and the valve body carrier 40 are still in their respective uppermost position. In the state according to FIG. 26, actuating elements 27 still have a small axial distance from pusher lugs 37 of closing pin 3.

Figure 27:
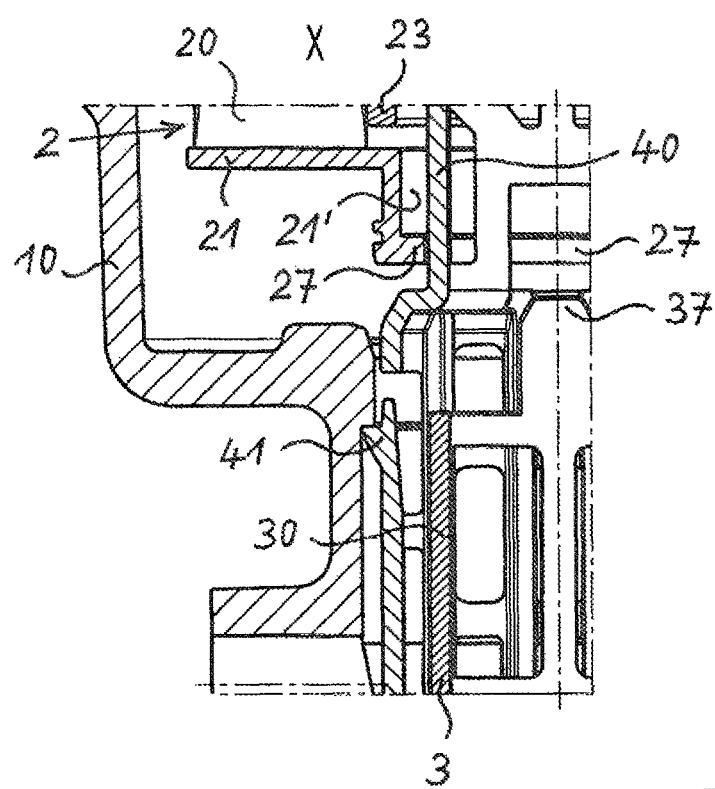

FIG. 27 shows detail X from FIG. 26 in an enlarged view. At left, a part of filter housing 10 is visible. At the top, the end region of filter insert 2 can be seen, namely parts of its lower end disk 21, of filter material body 20, and of supporting lattice 23. In its center, lower end disk 21 has central mounting opening 21', which is limited at the lower side by the circumferential collar forming actuating elements 27.

At a small axial distance below actuating elements 27, there is situated one of pusher lugs 37 of closing pin 3. In the lower part of FIG. 27, between guide segment 30 of closing pin 3 and filter housing 10 a cam of cam system 41 can be seen, which is seated on the associated step of filter housing 10.

Figure 28:
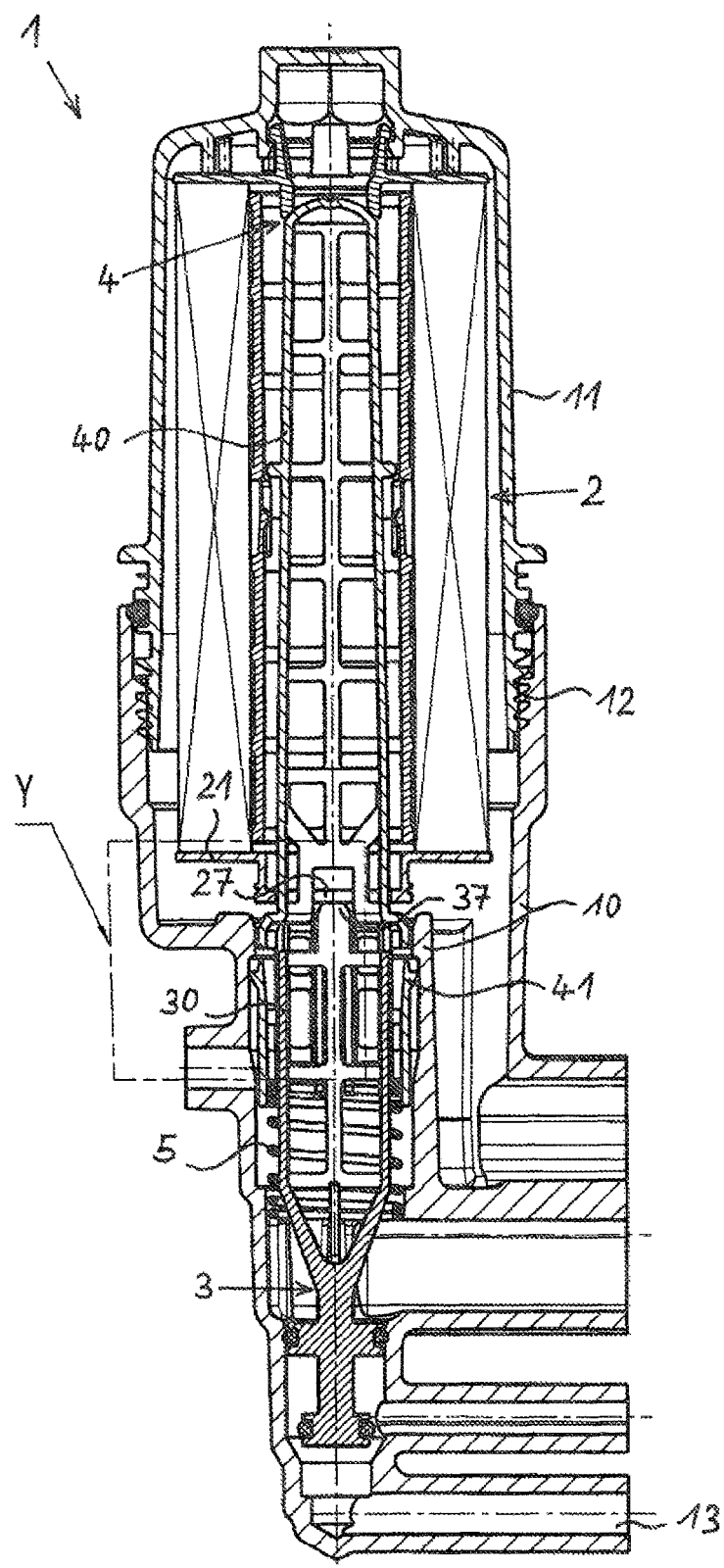

In FIG. 28, liquid filter 1 from FIG. 26 is shown in a state that arises after cover 11 is screwed slightly further into filter housing 10. Filter insert 2 is now moved downward, together with cover 11, far enough that actuating elements 27 just meet pusher lugs 37 of closing pin 3. Because the valve body carrier 40 is already seated on valve seat 24 with its valve body 44, valve body carrier 40 is already moved downward by a small distance, which can be seen in that the cam system 41 now has a small axial distance from the associated step of filter housing 10.

Figure 29:
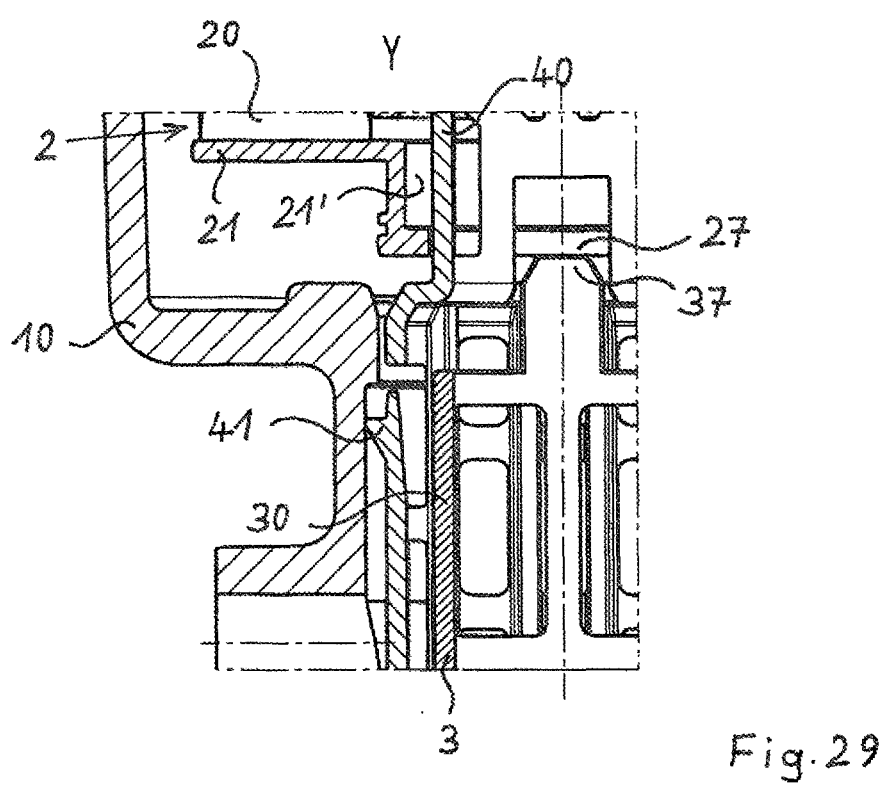

This state is shown in detail Y from FIG. 28, illustrated in FIG. 29 in an enlarged view. Here, in particular the seating of actuating elements 27 on pusher lugs 37 and the small axial distance of cam system 41 from the associated step of filter housing 10 can be seen.

Figure 30:
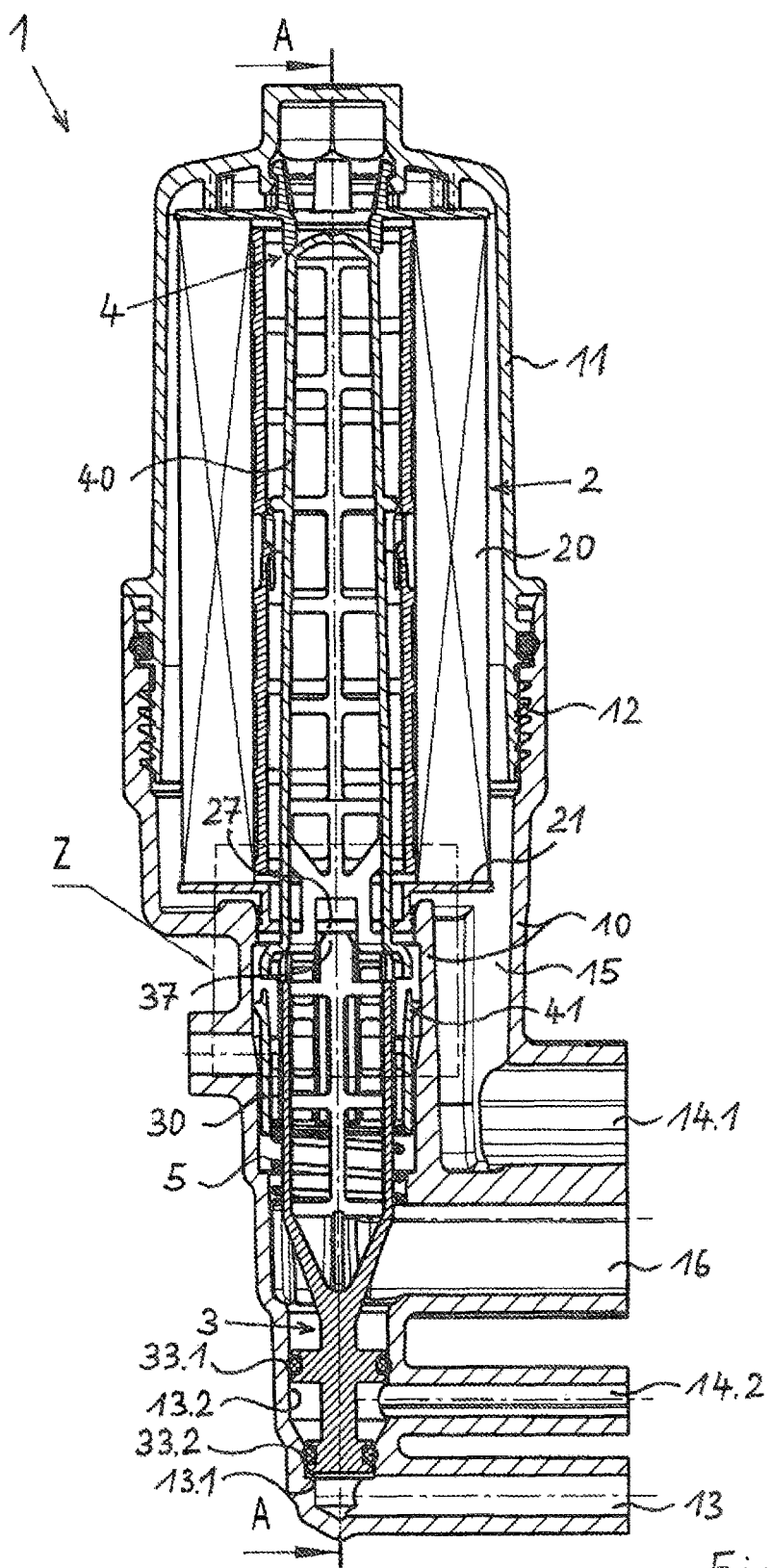

FIG. 30 shows liquid filter 1, now in its completely assembled state, in which cover 11 is screwed tightly to filter housing 10. Via actuating elements 27 on filter insert 2, closing pin 3 is pressed into its lowermost position, as is valve body carrier 40 by filter insert 2. In this position, seals 33.1 and 33.2 are situated in sealing position in segments 13.1 and 13.2 of discharge duct 13, whereby this duct is tightly sealed. Filter insert 2 is seated with its lower end disk 21 in sealing fashion in the central opening of filter housing 10, and filter bypass valve 4 at the upper end of valve body carrier 40 is closed, and as a result a flow connection from the raw side to the clean side exists only through filter material body 20 of filter insert 2.

Figure 31:
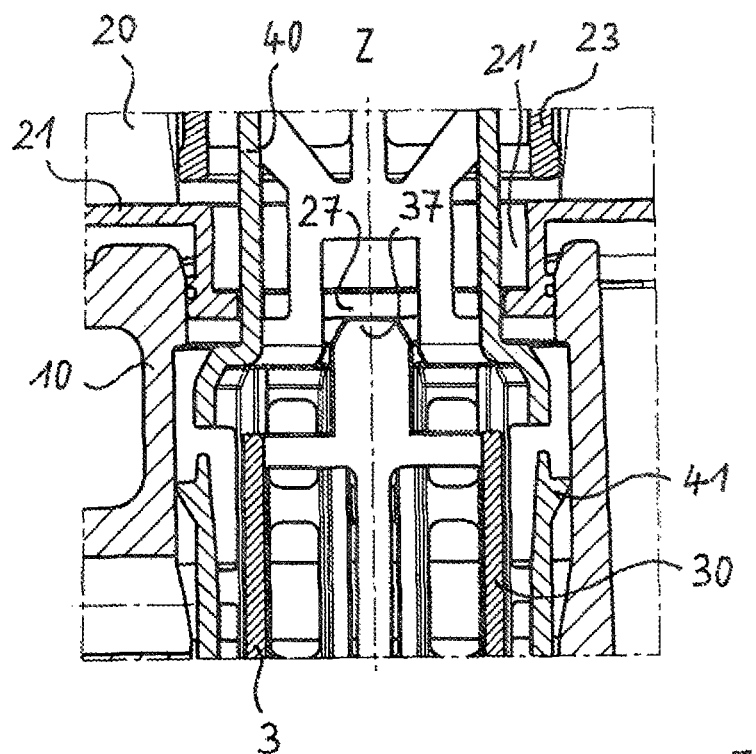

FIG. 31 shows detail Z from FIG. 30 in an enlarged view.

Figure 32:
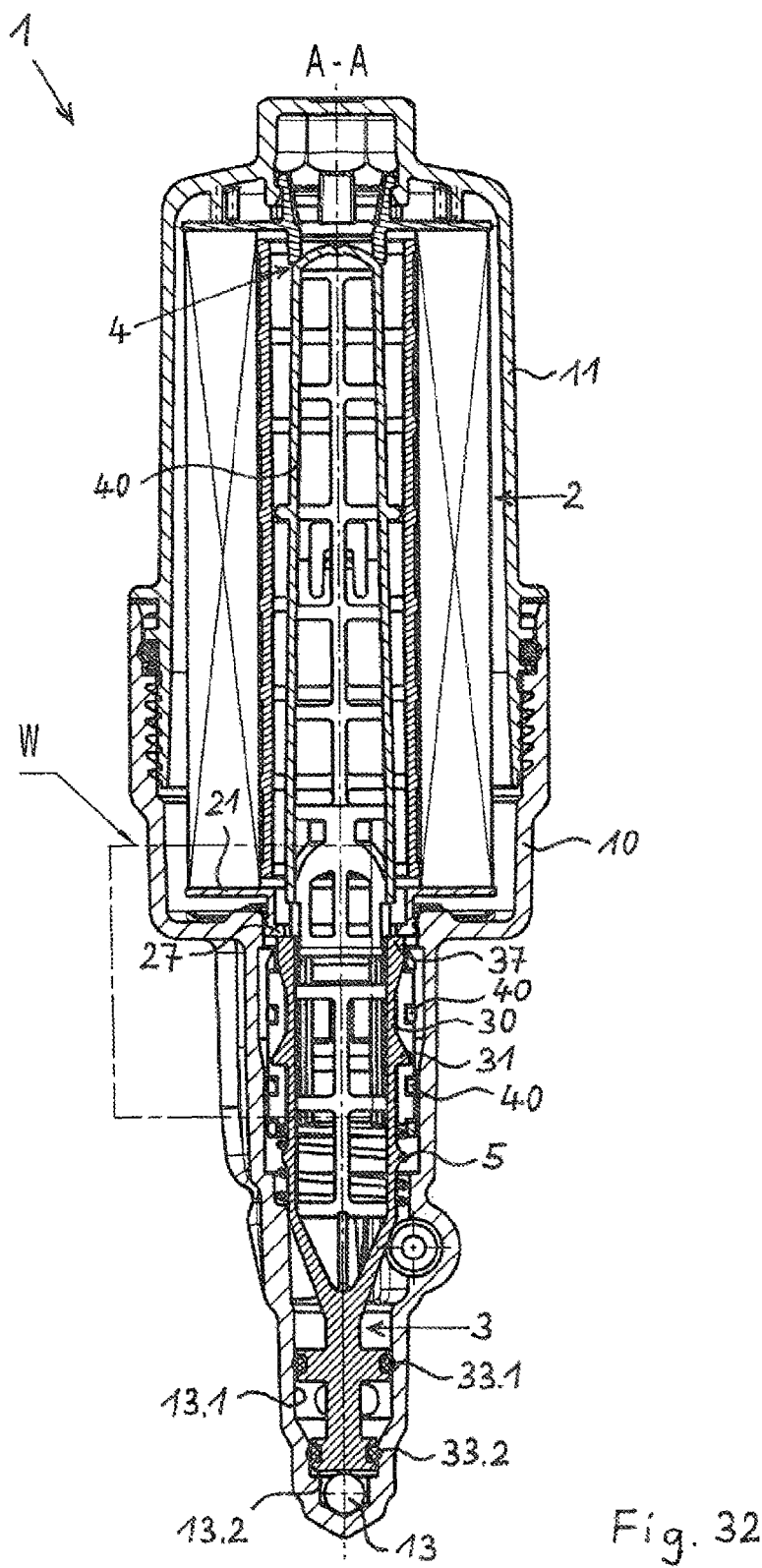

FIG. 32 shows liquid filter 1 from FIG. 30 in a longitudinal section rotated by 90° along the line A-A. In this sectional plane, the position of locking tongues 31 on guide segment 30 of closing pin 3 in openings of the lower region of valve body carrier 40 can be seen, whereby valve body carrier 40 guides closing pin 3 so as to be capable of limited axial displacement.

Figure 33:
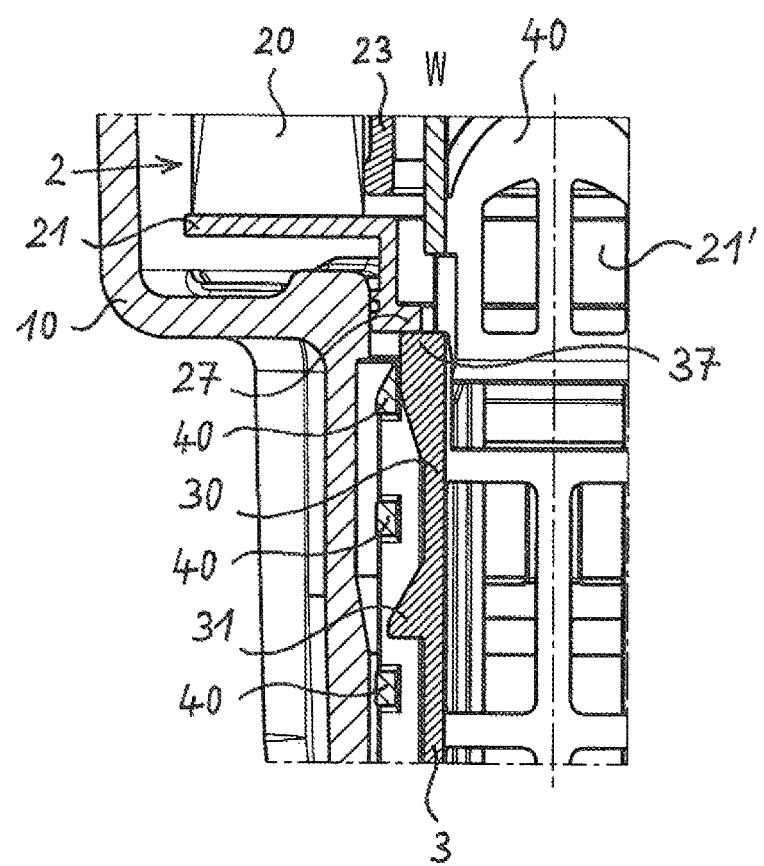

In FIG. 33, detail W from FIG. 32 is shown in an enlarged view.

In all further individual parts and functions, liquid filter 1 according to FIGS. 26 through 33 corresponds to the above-explained first exemplary embodiment, to whose description reference is made.

FIGS. 34 through 40, finally, show a fifth exemplary embodiment of the present invention. This exemplary embodiment corresponds essentially to the previously described fourth exemplary embodiment; in the fifth exemplary embodiment, the shape of actuating elements 27 on lower end disk 21 of filter insert 2 is different. Adapted thereto, valve body carrier 40 is also realized somewhat differently than in the fourth exemplary embodiment.

Figure 34:
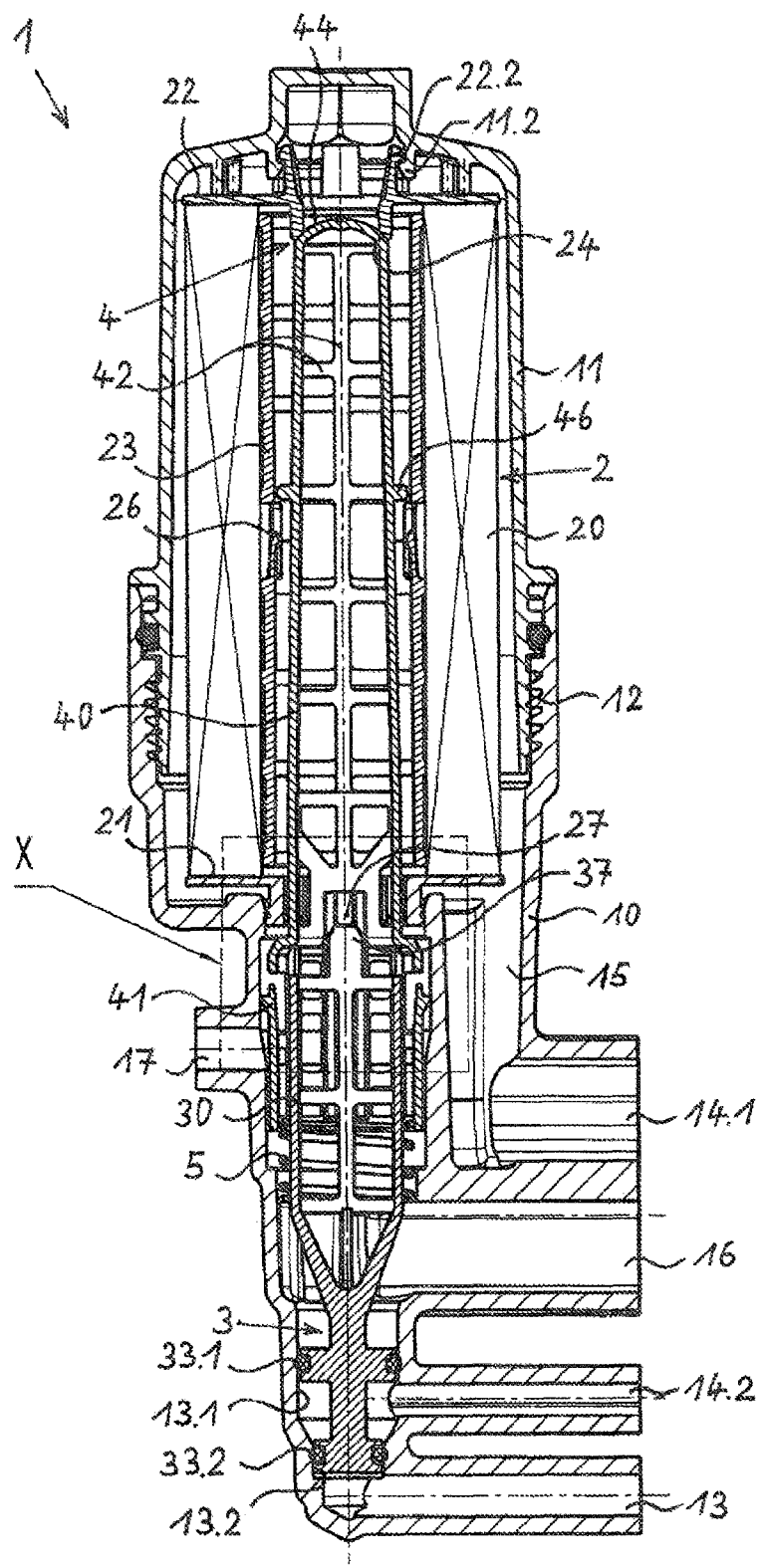
FIG. 34 through FIG. 40 show a fifth exemplary embodiment in various representations and various operating states.

FIG. 34 shows liquid filter 1 in its normal operating position. Cover 11 is connected to filter housing 10 together with filter insert 2. Via actuating elements 27 of filter housing 2, closing pin 3 is pressed downward into its closing position, and valve body carrier 40, loaded by the force of spring 5, lies with its valve body 44 against valve seat 24 of upper end disk 22 of filter insert 2.

Figure 35:
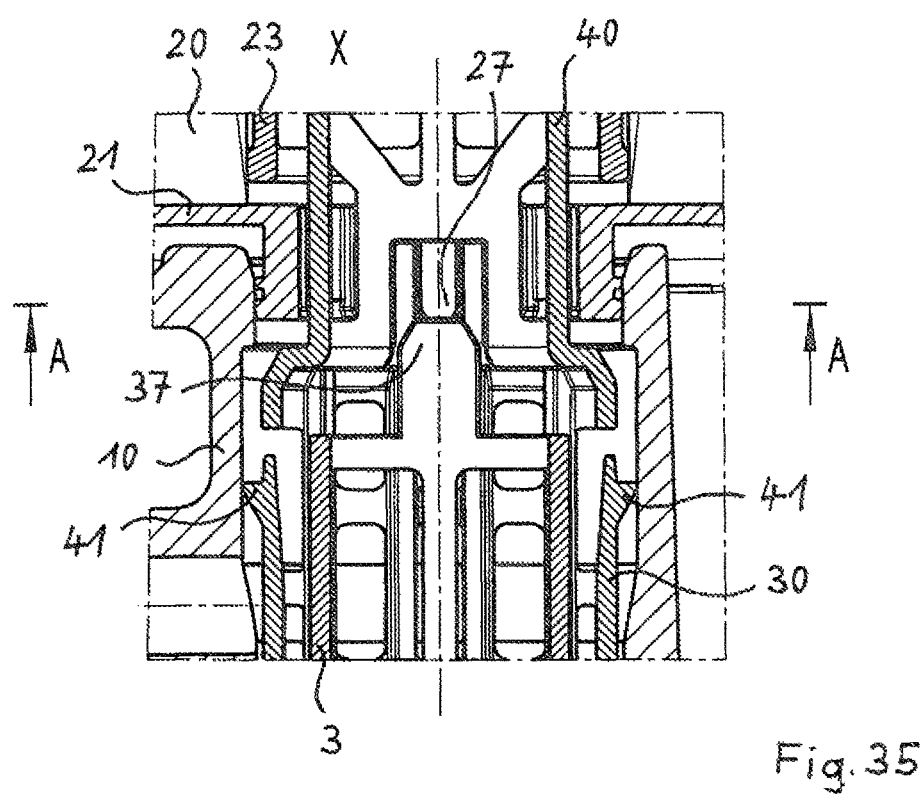

FIG. 35 shows detail X from FIG. 34 in an enlarged view.

Figure 36:
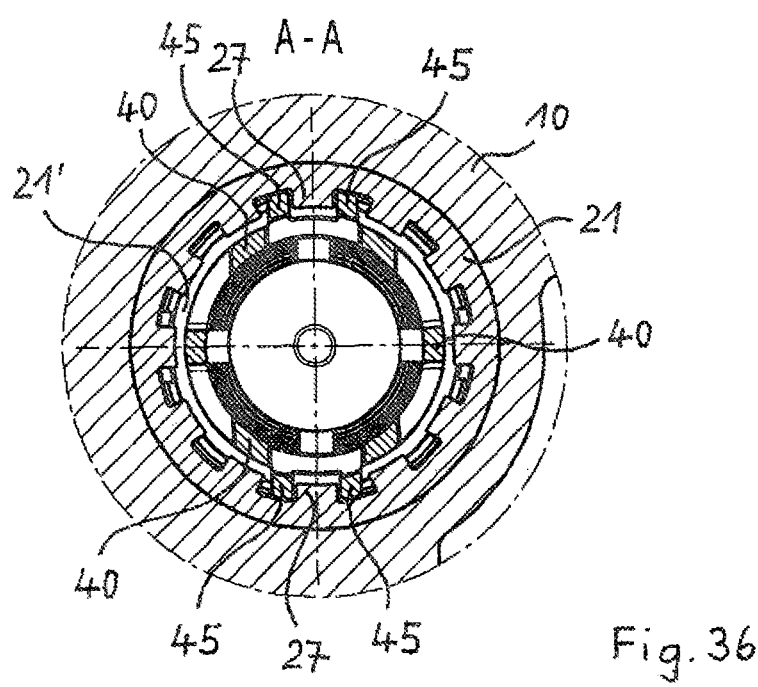

FIG. 36 shows a section through the liquid filter according to the line A-A in FIG. 35. Filter housing 10 is sectioned radially outwardly. Radially inwardly, lower end disk 21, with its central mounting opening 21', is situated therein. With mounting opening 21', lower end disk 21 is mounted onto valve body carrier 40, and with said lower end disk the rest of filter insert 2 (not visible here) is mounted onto the valve body carrier 40. Actuating elements 27 on the inner circumference of central mounting opening 21' of lower end disk 21 are here formed by radially inward-protruding teeth that are at a distance from one another in the circumferential direction. Each pair of oppositely situated teeth fit between two short ribs that run in the axial direction and that form positioning guide means 45 on valve body carrier 40. In this way, a key-lock system is realized that prevents the use of unsuitable foreign filter inserts in liquid filter 1 according to the present invention.

Figure 37:
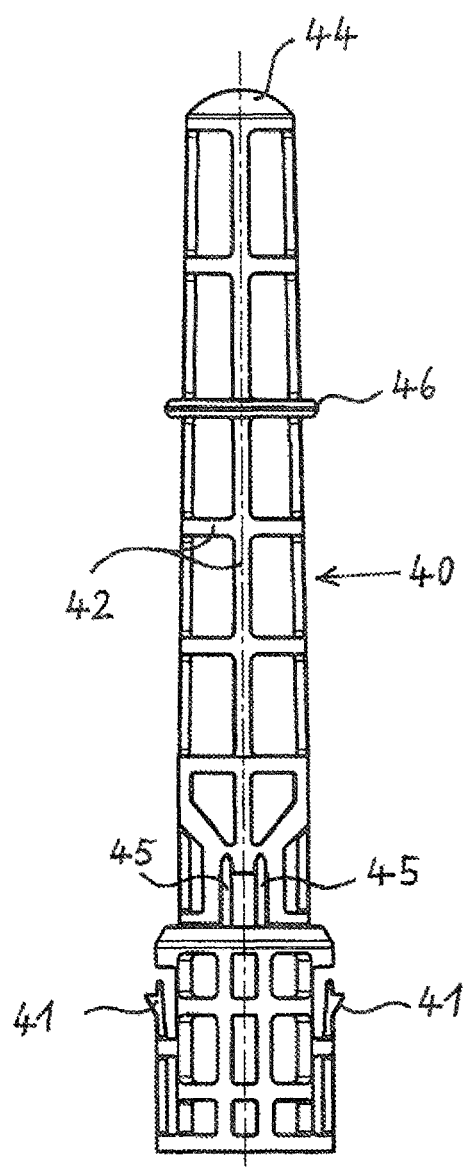

FIG. 37 shows a view of a valve body carrier 40 as an individual part. Valve body carrier 40 has the form of a lattice-shaped hollow cylindrical body made up of carrier struts 42 that run in the circumferential direction and in the longitudinal direction. At the very top of valve body carrier 40, here dome-shaped valve body 44 is integrally formed on in one piece. At a distance under this, second locking connection means 46 are situated in the form of a circumferential locking bulge. Still further downward there follow positioning guide means 45 on the outer circumference of valve body carrier 40, which cooperate with actuating elements 27 of filter insert 2 as described above. Finally, on the lowermost segment of valve body carrier 40, cam system 41 can be seen having the two oppositely situated flexible locking tongues that carry the cams.

Figure 38:
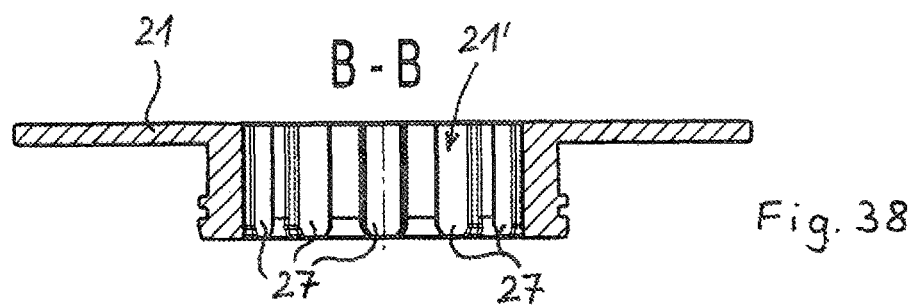

FIG. 38 shows lower end disk 21 of filter insert 2 of liquid filter 1 from FIG. 34, in cross section as an individual part. Here, the toothing situated on the inner circumference of central mounting opening 21', for the formation of actuating elements 27, can be seen particularly clearly. The individual teeth are distributed uniformly in the circumferential direction and run in the axial direction of end disk 21. Each tooth has on its lower end run-in chamfers that facilitate the running in of the two teeth cooperating with positioning guide means 45 on valve body carrier 40.

Figure 39:
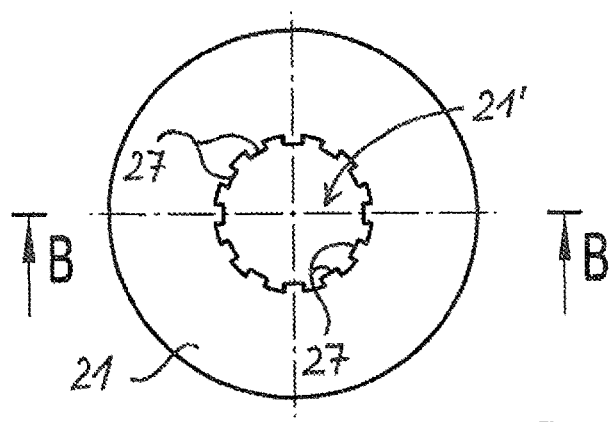

FIG. 39 shows a plan view of end disk 21. Here in particular the regular configuration of the teeth, forming actuating elements 27, of the toothing on the inner circumference of central mounting opening 21' can be seen clearly.

Figure 40:
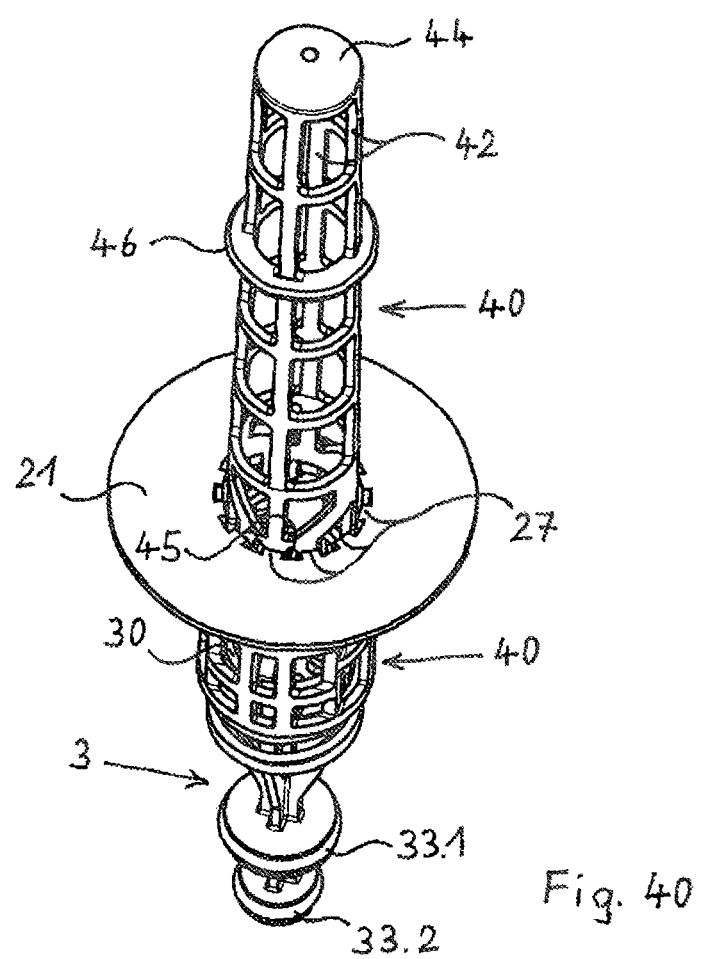

Finally, FIG. 40 shows, in a perspective view, the cooperation of closing pin 3, valve body carrier 40, and end disk 21. At the top in FIG. 40, valve body carrier 40 can be seen with its valve body 44 and with second locking connection means 46. Closing pin 3 is inserted from below into valve body carrier 40 and is locked there. From above, end disk 21 is mounted onto valve body carrier 40, said end disk cooperating, via its tooth-shaped actuating elements 27, with positioning guide means 45 on valve body carrier 40, in the manner of a key-lock system. Via each of the actuating elements 27 that come to be situated between positioning guide means 45, closing pin 3 is actuated downward in the direction of insertion relative to filter housing 10. In this way, the use of an unsuitable foreign filter insert having a lower end disk that has a smooth inner circumference is prevented, because such a foreign filter insert would not be able to push connecting pin 3 downward into its sealing closing position. In this case, the discharge duct would then remain open, and it would not be possible for a liquid pressure to build up in liquid filter 1. In the case of an oil filter of an internal combustion engine, this would be signaled for example by illumination of the oil pressure warning lamp. A corresponding pressure sensor can for example be connected to a pressure sensor connection 17 on filter housing 10.

For reasons of durability, filter housing 10 of liquid filter 1 is preferably made of a light metal such as aluminum, and is usefully produced using a die-casting method. Connecting pin 3 and valve body carrier 40, as well as end disks 21 and 22 and supporting lattice 23 of filter insert 2, are preferably made of a plastic such as polyamide, for reasons of weight and disposability, and are usefully injection-molded parts.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS

1 liquid filter overall
10 filter housing
11 removable cover
11.2 locking connection means for 22.2
12 screw threading
13 discharge duct
13.1, 13.2, 13.3 segments of 13
14.1, 14.2 connecting channels
15 raw liquid inlet
16 clean liquid outlet
17 pressure sensor connection
2 filter insert
20 filter material body
21 lower end disk
21' central mounting opening in 21
22 upper end disk
22.2 locking connection means for 11.2
23 support lattice in 20
24 valve seat in 22
25 positioning guide means on 2
26 second locking connection means
27 actuating elements on 2 for 37
3 connecting pin
30 guide segment in 4
31 locking tongues
33, 33.1, 33.2 seals on 3
35 holding cams for 5
37 pusher lugs
4 filter bypass valve
40 valve body carrier
41 cam system
42 carrier struts
44 valve body
45 positioning guide means on 4
46 second locking connection means
5 spring
6 preassembled assembly

The invention claimed is:

1. A liquid filter, comprising:
a filter housing having a removable cover and having a raw liquid inlet and a clean liquid outlet,
a filter insert situated exchangeably in the filter housing and that separates a raw side and a clean side of the liquid filter from one another,
the insert having a hollow cylindrical filter material body enclosed at its end faces by two end disks,
the end disk that is a lower end disk in the installed state having a central mounting opening,
the liquid filter having a filter bypass valve, for which purpose the end disk that is an upper end disk in the installed state having on its lower side a central valve seat that cooperates with a valve body, the filter housing further having a central discharge duct for emptying the filter housing when the filter insert is removed, and there being situated in the discharge duct a closing pin that is fixed to the housing in the installed state and that can be axially displaced between a closed position, assumed when the filter insert is installed and the cover is closed, and an open position, assumed when the cover is removed and the filter insert is removed, a valve body carrier connected to the closing pin, so as to be capable of axially limited displacement, the valve body carrier running through the filter insert and having a valve body of the filter bypass valve on its free end, and onto which the filter insert is arranged to be mounted with its end disk having the mounting opening forward, a spring supported on the filter housing which pre-loads the valve body carrier with a force, acting in the closing direction of the filter bypass valve, and the filter insert being arranged to exert, during or during and after its mounting onto the valve body carrier, a force acting directly on the closing pin in a direction toward the closing position of the closing pin.

2. The liquid filter as recited in claim 1, wherein the valve body carrier and the valve body of the filter bypass valve are fashioned in one piece.

3. The liquid filter as recited in claim 1, wherein the closing pin has in its upper end region two or more pusher lugs that are distributed around the circumference and that protrude radially outward past an outer circumference of the valve body carrier, on which lugs the filter insert can exert the thrust force acting in the direction toward the closing position of the closing pin.

4. The liquid filter as recited in claim 1, wherein the closing pin and the valve body carrier are guided so as to be incapable of rotation relative to one another.

5. The liquid filter as recited in claim 3, wherein actuating elements for the pusher lugs are situated on one of the lower end disk or on a supporting lattice of the filter insert.

6. The liquid filter as recited in claim 5, wherein the actuating elements are formed by one of:
two or more ribs that protrude radially inward and that run axially, or
a configuration of teeth having a plurality of teeth that protrude inward radially and that run axially.

7. The liquid filter as recited in claim 5, wherein on an inner circumference of the filter insert, and on an outer circumference of the valve body carrier, there are situated cooperating positioning guides by which the filter insert can be force-guided during its mounting onto the valve body carrier in the circumferential direction into an engagement-ready position of its actuating elements relative to the pusher lugs.

8. The liquid filter as recited in claim 7, wherein the actuating elements for the pusher lugs are identical to the positioning guide means provided on the filter insert.

9. The liquid filter as recited in claim 1, wherein a helical pressure spring surrounding the closing pin is situated as a spring between the lower end of the valve body carrier and the filter housing.

10. The liquid filter as recited in claim 9, wherein on an outer circumference of the valve body carrier there are provided a plurality of outward-oriented holding cams that, when the spring is relaxed, stand in engagement with the spring, and when the spring is at least partly compressed, stand out of engagement with the spring.

11. The liquid filter as recited in claim 1, wherein the valve body carrier is guided with a lower segment in the filter housing so as to be axially displaceable, and that the displacement path of the valve body carrier in the direction of extension relative to the filter housing is limited by a flexible cam system.

12. The liquid filter as recited in claim 1, wherein the cover has on its lower side, and the upper end disk of the filter insert has on its upper side, cooperating first locking connection means that can be released and that are capable of rotation relative to one another, by which a specifiable first tensile force can be transmitted in the axial direction.

13. The liquid filter as recited in claim 12, wherein the filter insert and the valve body carrier or the connecting pin have cooperating releasable second locking connection means by which a specifiable second tensile force, which is smaller than the first tensile force, can be transmitted in the axial direction.

14. The liquid filter as recited in claim 1, wherein one, or each, seal provided on the closing pin is a radially sealing seal.

15. The liquid filter as recited in claim 1, wherein the closing pin has in its lower part that cooperates with the discharge duct a radially sealing seal, and wherein the discharge duct has, in its region that cooperates with the seal during the axial movement of the closing pin, two segments having different inner diameters becoming larger going from below to above in stepped fashion, the seal being situated freely in the segment having the larger inner diameter in the open position of the closing pin, and sealing in the segment having the smaller inner diameter in the closing position of the closing pin.

16. The liquid filter as recited in claim 1, wherein a heat exchanger for the liquid flowing through the liquid filter is connected or is capable of being connected to the liquid filter, and wherein the connecting pin has, in its lower part that cooperates with the discharge duct, two seals that are axially at a distance from one another and that seal radially and that have different diameters, and wherein the discharge duct, in its region that cooperates with the seals during the axial movement of the closing pin, has two segments having different inner diameters, becoming larger in stepped fashion going from below to above, the seal having the smaller diameter being situated in sealing fashion in the segment having the smaller inner diameter in the closing position of the closing pin, and being open in the segment having the larger inner diameter in the open position of the closing pin, the seal having the larger diameter always being situated in sealing fashion in the segment having the larger inner diameter, and a first connecting channel between the liquid filter and the heat exchanger above the seal having the larger diameter going out from the discharge duct, and a second connecting channel between the heat exchanger and the liquid filter between the two seals opening into the discharge duct.

17. The liquid filter as recited in claim 1, wherein a heat exchanger for the liquid flowing through the liquid filter is connected or is capable of being connected to the liquid filter, and wherein the connecting pin has, in its lower part that cooperates with the discharge duct, two radially sealing seals that are axially at a distance from one another and that have different diameters, and wherein the discharge duct, in its region that cooperates with the seals during the axial movement of the closing pin, has three segments having different inner diameters, becoming larger in stepped fashion going from below to above, the seal having the smaller diameter being situated in sealing fashion in the segment having the smallest inner diameter in the closing position of the closing pin, and being open in the segment having the middle inner diameter in the open position of the closing pin, the seal having the larger diameter being situated in sealing fashion in the segment having the middle inner diameter in the closed position of the closing pin and being open in the segment having the largest inner diameter in the open position of the closing pin, and a first connecting channel between the liquid filter and the heat exchanger above the seal having the larger diameter going out from the discharge duct, and a second connecting channel between the heat exchanger and the liquid filter between the two seals opening into the discharge duct.

18. The liquid filter as recited in claim 1, wherein the liquid filter can be assembled from the filter housing and a preassembled assembly during its first assembly, the preassembled assembly including the closing pin, the valve body carrier, the spring, the filter insert, and the cover.

19. A filter insert for a liquid filter, comprising:
a hollow cylindrical filter material body enclosed at its ends by two end discs, the end disc that is a lower end disc in the installed state having a central mounting opening for mounting the filter insert onto a central valve body carrier of the liquid filter,
actuating elements which are situated on the filter insert or are guided with the filter insert, by means of which elements the filter insert can exert a force directly on pusher lugs of a discharge duct closing pin of the liquid filter, the force acting in the direction toward a closing position of the closing pin, and
first positioning guide means situated on an inner circumference of the filter insert that are fashioned to cooperate with second positioning guide means situated on an outer circumference of the valve body carrier, such that with the first and second positioning guide means the filter insert can be force-guided into a position proper for engagement of its actuating elements relative to the pusher lugs when the filter insert is mounted onto the valve body carrier in the circumferential direction.

20. The filter insert as recited in claim 19, wherein the actuating elements are situated on at least one of the lower end disk and a central supporting lattice of the filter insert.

21. The filter insert as recited in claim 19, wherein the actuating elements are formed by one of:
two or more ribs that protrude inward radially and that run axially, and
a configuration of teeth having a plurality of teeth that protrude inward radially and that run axially.

22. The filter insert as recited in claim 19, wherein the first positioning guide means are situated on at least one of the lower end disk and a central support lattice of the filter insert.

23. The filter insert as recited in claim 19, wherein the actuating elements for the pusher lugs are identical to first positioning guide means provided on the filter insert.

24. The filter insert as recited in claim 19, wherein the actuating elements for the pusher lugs and the first positioning guide means provided on the filter insert are fashioned individually and separately.

* * * * *